United States Patent [19]
Tanaka et al.

[11] Patent Number: 5,260,934
[45] Date of Patent: Nov. 9, 1993

[54] GROWABLE INTERCONNECT FABRIC CELL SWITCH MODULE

[75] Inventors: Tsutomu Tanaka, Nishinomiya; Hiroshi Yokota, Osaka, both of Japan

[73] Assignee: Matsushita Electric Industrial Co., Ltd., Osaka, Japan

[21] Appl. No.: 746,483

[22] Filed: Aug. 16, 1991

[30] Foreign Application Priority Data

Aug. 17, 1990 [JP] Japan .................................. 2-217445
Apr. 26, 1991 [JP] Japan .................................. 3-097505

[51] Int. Cl.[5] ........................ H04Q 11/04; H04Q 3/00
[52] U.S. Cl. ........................................ 370/54; 370/60;
370/65; 370/94.1; 340/826; 340/825.8; 379/272
[58] Field of Search .................. 370/16, 54, 58.1–58.3,
370/60, 60.1, 61, 65, 65.5, 94.1, 85.6;
340/825.03, 826, 827, 825.8, 825.5, 825.51;
379/219–221, 271–273

[56] References Cited

U.S. PATENT DOCUMENTS

| | | | |
|---|---|---|---|
| 4,038,638 | 7/1977 | Hwang | 379/272 |
| 4,400,627 | 8/1983 | Zola | 379/271 |
| 4,788,679 | 11/1988 | Kataoka et al. | 370/60 |
| 4,955,016 | 9/1990 | Eng et al. | 370/60 |
| 4,955,017 | 9/1990 | Eng et al. | 370/60 |
| 5,103,220 | 4/1992 | Brünle | 340/826 |

OTHER PUBLICATIONS

A Growable Packet (ATM) Switch Architecture: Design Principles and Applications, by Kai Y. Eng, et al.
Performance Analysis of a Growable Architecture for Broadband Packet (ATM) Switching, by Mark J. Karol et al.

Primary Examiner—Benedict V. Safourek
Assistant Examiner—Alpus H. Hsu
Attorney, Agent, or Firm—Price, Gess & Ubell

[57] ABSTRACT

A growable interconnect fabric cell switch module including a plurality of first cell switches for interconnecting cells; a plurality of second cell switches for interconnecting the cells outputted from the first cell switches; a plurality of third cell switches for interconnecting the cells outputted from the second cell switches; and a path arbitrating device for making a decision on cell transfer permission and on which second cell switch ought to be used in a cell transfer, based on a demanded cell number, which indicates a number of the cells which demand to be transferred from each first cell switch to each third cell switch.

34 Claims, 24 Drawing Sheets

| Input to the shift register | D3 (MSB) | D2 | D1 | D0 (LSB) |
|---|---|---|---|---|
| Output from the shift register | Q3 (MSB) | Q2 | Q1 | Q1 (LSB) |
| 1st shift | 0 | 0 | 0 | D3 |
| 2nd shift | 0 | 0 | D3 | D2 |
| 3rd shift | 0 | D3 | D2 | D1 |
| 4th shift | D3 | D2 | D1 | D0 |

Demanded cell number to k=1
Frame synchronizing pattern

Fig. 8

Demanded cell number registering table

|   | k=1 | k=2 | k=3 | k=4 |
|---|---|---|---|---|
| i = 1 | 2 <br> j=1 | 0 <br> j=4 | 1 <br> j=3 | 1 <br> j=2 |
| i = 2 | 0 <br> j=2 | 3 <br> j=1 | 1 <br> j=4 | 0 <br> j=3 |
| i = 3 | 1 <br> j=3 | 1 <br> j=2 | 1 <br> j=1 | 1 <br> j=4 |
| i = 4 | 1 <br> j=4 | 0 <br> j=3 | 1 <br> j=2 | 2 <br> j=1 |

Fig. 9

Re-assignment demanding table

|   | k=1 | k=2 | k=3 | k=4 |
|---|---|---|---|---|
| i = 1 | 1 <br> j=1 | j=4 | j=3 | j=2 |
| i = 2 | j=2 | 2 <br> j=1 | j=4 | j=3 |
| i = 3 | j=3 | j=2 | j=1 | j=4 |
| i = 4 | j=4 | j=3 | 1 <br> j=2 | j=1 |

→ 1 after re-assignment (i=2, k=2)

→ 0 after re-assignment (i=4, k=3)

Fig. 10

Unused path supervising table

|  | k=1 | k=2 | k=3 | k=4 |
|---|---|---|---|---|
| i = 1 | j=1 | ✶ j=4 | j=3 | j=2 |
| i = 2 | ✶ j=2 | j=1 | j=4 | ✶ j=3 |
| i = 3 | j=3 | j=2 | j=1 | j=4 |
| i = 4 | j=4 | ✶ j=3 | j=2 | j=1 |

Fig. 11

Used path registering table

|  | j=1 | j=2 | j=3 | j=4 |
|---|---|---|---|---|
| i = 1 | k=1 | k=4 | k=3 | k=2 after re-assignment |
| i = 2 | k=2 |  |  | k=3 |
| i = 3 | k=3 | k=2 | k=1 | k=4 |
| i = 4 | k=4 | k=3 | k=4 after re-assignment | k=1 |

| | | | |
|---|---|---|---|
| R34x | R33x | R32x | R31x |
| x44 34x | x31 33x | x22 32x | x13 31x |
| 342 | 333 | 324 | 311 |
| 343 | 334 | 321 | 312 |
| 341 | 323 | 323 | 314 |

| | | | |
|---|---|---|---|
| Ax44 | Ax13 | Ax22 | Ax31 |
| x44 | x13 | x22 | x31 |
| 444 | 413 | 422 | 431 |
| 144 | 113 | 122 | 131 |
| 244 | 213 | 222 | 231 |

(3,4,4) D344 x44 3x4

(3,1,3) D313 x13 3x3

(3,2,2) D322 x22 3x2

(3,3,1) D331 x31 3x1

| R44x x41 | 44x | R43x x32 | 43x | R42x x23 | 42x | R41x x14 | 41x |
|---|---|---|---|---|---|---|---|
| 442 443 444 | | 433 434 431 | | 424 421 422 | | 411 412 413 | |

| Ax14 x14 | Ax23 x23 | Ax32 x32 | Ax41 x41 |
|---|---|---|---|
| 114 214 314 | 123 223 323 | 132 232 332 | 141 241 341 |

| | D414 x14 4x4 | D423 x23 4x3 | D432 x32 4x2 | D441 x41 4x1 |
|---|---|---|---|---|
| (4,1,4) | | | | |
| (4,2,3) | | | | |
| (4,3,2) | | | | |
| (4,4,1) | | | | |

Fig. 15

| i \ k | 1 | 2 | 3 | 4 |
|---|---|---|---|---|
| 1 | 1 | 5 | 5 | 5 |
| 2 | 2 | 2 | 6 | 6 |
| 3 | 3 | 3 | 3 | 7 |
| 4 | 4 | 4 | 4 | 4 |

Frame synchronizing pattern

Number of k which permits the usage of j=1

Fig. 19

Demanded cell number registering table

|  | k=1 | k=2 | k=3 | k=4 |
|---|---|---|---|---|
| i=1 | 2 j=1 | 0 j=4 | 1 j=3 | 1 j=2 |
| i=2 | 0 j=2 | 2 j=1 | 1 j=4 | 1 j=3 |
| i=3 | 1 j=3 | 1 j=2 | 1 j=1 | 1 j=4 |
| i=4 | 1 j=4 | 1 j=3 | 1 j=2 | 1 j=1 |

Fig. 20

Re-assignment demanding table

|  | k=1 | k=2 | k=3 | k=4 |
|---|---|---|---|---|
| i=1 | 1 j=1 |  |  | →0 |
| i=2 |  | 1 j=1 |  | →0 |
| i=3 |  |  |  |  |
| i=4 |  |  |  |  |

Fig. 21

Unused path supervising table

|  | k=1 | k=2 | k=3 | k=4 |
|---|---|---|---|---|
| i=1 |  | ✱ j=4 |  |  |
| i=2 | ✱ j=2 |  |  |  |
| i=3 |  |  |  |  |
| i=4 |  |  |  |  |

Fig. 22

Used path registering table

|  | j'=1' | j'=2' | j'=3' | j'=4' |
|---|---|---|---|---|
| i'=1' |  |  |  |  | → k=1
| i'=2' |  |  |  |  | → k=2
| i'=3' |  |  |  |  |
| i'=4' |  |  |  |  |

| Inputted value | Outputted value |
|---|---|
| 0 ~ 0.2 | 0 |
| 0.2 ~ 0.4 | 1 |
| 0.4 ~ 0.6 | 2 |
| 0.6 ~ 0.8 | 3 |
| 0.8 ~ 1.0 | 4 |

GROWABLE INTERCONNECT FABRIC CELL SWITCH MODULE

BACKGROUND OF THE INVENTION (1) Field of the Invention

This invention relates to a cell switch module used in an ATM switching board of the broadband ISDN, especially to a growable interconnect fabric cell switch module comprising cell switches connected to one another in a multiple-step architecture and also to a method for arbitrating cell transfer paths by use of the growable interconnect fabric cell switch module.

(2) Description of the Prior Art

FIG. 1 shows a construction of an ATM switching board used in an ATM switching channel system. Each element of the ATM switching board functions as follows.

Each line interface (LIF) 2301, which is provided for each line connected to the ATM switching board, carries out O/E conversion, E/O conversion, S/P conversion, P/S conversion, cell synchronization, header conversion, traffic monitoring and traffic control.

ATM switches (SW) 2302, for exchanging ATM cells, each has a 32×32 construction, are interconnected in a three-step architecture to form a 1024×1024 switch module. In theory, cells are transferred with no conflict in whichever way the 1,024 input lines and the 1,024 output lines are combined if an optimum path is provided.

Each line interface 2301 inputs and outputs an STM-1 signal having a transfer speed of 155.52 M bit/sec. The ATM switching board receives 1,024 STM-1 signals of this speed in total. The above speed allows a transfer of a fast and large-capacity digital signal such as a high-speed data and a TV signal.

In recent years, there has been a demand for a transfer capacity several times larger than 155.52 M bits/sec. in order to deal with, for example, a high definition television signal. Such a signal should be transferred as an STM-4 signal, which is obtained by concatenation-multiplexing four STM-1 signals. The STM-4 signal, however, cannot be interfaced by a switching board only with a capability of dealing with STM-1 signals.

In order to overcome such an inconvenience, a VC4-4C signal of an STM-4 payload as shown in FIG. 2a is divided into four VC-4 signals of an STM-1 payload as shown in FIG. 2b by a multiplexing device (not shown) and transferred to an identical destination before being concatenation-multiplexed.

With a switching board with conventional cell switches, however, the improvement in delay-throughput is limited and concatenation-multiplexed signals cannot be transferred properly.

Theoretically, the cell transfer with no conflict is possible as mentioned above. Practically, however, an optimum transfer path should be assigned for each cell path and for each time required to transfer a cell. Such an assignment is extremely difficult to do with software or hardware.

According to one of known devices to solve the above inconvenience, each S switch is equipped with a buffer memory for temporarily retaining some of the cells which have been inputted to each F switch simultaneously and destined to an identical T switch. The above-retained cells are sometimes delayed in transfer, in which case, the order of the cells is reversed after the cells are concatenation-multiplexed. As shown in FIG. 2b, cells C1 through C4 are inputted simultaneously and cells C5 through C8 are inputted simultaneously. However, the cells C2 and C6, which are retained in the buffer memory, are delayed in transfer as shown in FIG. 2c. Consequently, the original signal is not restored accurately.

According to another such device, the cells which may conflict are detected in advance, and which transfer paths will avoid cell conflict is determined. The cells are made to wait in the F switches until the determination is completed. This results in a drastic decrease in the transfer speed.

It is also known that more than 32 ATM switches 2302 are provided in order to send a smaller number of cells are each ATM switch cells and thus lower the possibility of cell conflict. This device requires a huge hardware system but cannot prevent the reversal of the cell order completely.

SUMMARY OF THE INVENTION

Accordingly, this invention has an object of offering a growable interconnect fabric cell switch module for improving the delay-throughput by preventing cell conflict.

Another object of this invention is to offer a method for arbitrating cell transfer paths by use of the above growable interconnect fabric cell switch module.

In line with the above objects, this invention is characterized in arbitrating cell transfer paths by use of a growable interconnect fabric cell switch module [M]. The module [M] includes a plurality of first cell switches for interconnecting cells; a plurality of second cell switches for interconnecting the cells outputted from the first cell switches; a plurality of third cell switches for interconnecting the cells outputted from the second cell switches; and a path arbitrating device for making a decision on cell transfer permission and on which second cell switch ought to be used in a cell transfer, based on a demanded cell number, which indicates a number of the cells which demand to be transferred from each first cell switch to each third cell switch.

Also in line with the above objects, there is provided a growable interconnect fabric cell switch module [N] having a plurality of first cell switches for interconnecting cells, a plurality of second cell switches for interconnecting the cells outputted from the first cell switches and a plurality of third cell switches for interconnecting the cells outputted from the second cell switches. The above module [N] includes a demanded cell number determining device for determining a demanded cell number, which is a number of the cells which demand to be transferred from each first cell switch to each third cell switch; a path assigning device for assigning a path based on an assignment status of a path between the first cell switches and the second cell switches, an assignment status of a path between the second cell switches and the third cell switches, and a difference between the demanded cell number and a number of paths which are already assigned; and a cell transfer controlling device for transferring the cell through the assigned path.

Also in line with the above objects, there is provided a growable interconnect fabric cell switch module having a plurality of first cell switches for interconnecting cells, a plurality of second cell switches for interconnecting the cells outputted from the first cell switches and a plurality of third cell switches for interconnecting the cells outputted from the second cell switches. The above module includes a demanded cell number determining device for determining a demanded cell number, which is a number of the cells which demand to be transferred from each first cell switch to each third cell switch; a path assigning device for assigning a non-default path based on a permission status of a transfer demand and an assignment status of a path between the first cell switches and the second cell switches; and a cell transfer controlling device for transferring the cell through the assigned path. The above transfer demand is unsatisfied and employs one of the paths between the second cell switches and the third cell switches. The paths between the second cell switches and the third cell switches are included in default paths between the first cell switches and the third cell switches. The demanded cell number for the third cell switch of the above one path is 0. The above path between the first cell switch and a second cell switch is required to be used together with the above one path between the second cell switches and the third cell switches in order to fulfill the transfer demand.

In the above construction, the paths between the first and the second cell switches and the paths between the second and the third cell switches are assigned so that the paths are used to the fullest and also so that the cells are transferred with no fail. Therefore, no cell conflict occurs and the delay-throughput is greatly improved.

In the switch module [M], the path arbitrating device may comprise a demanded cell number retaining device for retaining the demanded cell number; a transfer path detecting device for detecting an unused path between the second cell switches and the third cell switches based on the demanded cell number retained by the demanded cell number retaining device; a data retaining device for retaining a data which indicates an assignment status of a path between the first cell switches and the second cell switches; a path assignment demanding device for demanding an assignment of a path between at least one of the first cell switches and the third cell switches, the above one having the demanded cell number of at least 2; a path assigning device for assigning a path between the first cell switches and the second cell switches and a path between the second cell switches and the third cell switches based on the detection result of the transfer path detecting device, the data retained by the data retaining device and the demand of the path assignment demanding device; and a path data registering device for registering a data indicating the assigned path between the first cell switches and the second cell switches in the data retaining device. Such switch module will be referred to the switch module [P].

Also in the switch module [M], each first cell switch may comprise queue buffers corresponding to the third cell switches, respectively; and a demanded cell number obtaining device for obtaining the demanded cell numbers. The demanded cell numbers are in substantially the same ratio as numbers of the cells stored in the cell queues, and a sum of the demanded cell numbers is, at the maximum, equal to a transferrable cell number, which indicates a number of the cells which can be transferred from the first cell switch to the second cell switches. Such switch module will be referred to the switch module [Q].

In the above construction, the cells which are sent to the queue buffers earlier are transferred with a higher priority. Accordingly, the waiting time of the cells is shortened and so the delay-throughput is improved.

The switch module [P] may further comprise a plurality of fourth cell switches and a plurality of fifth switches for providing a bypass between the first cell switches and the second cell switches; and a bypass arbitrating device for making a decision on permission of the cell which is not permitted to be transferred by the path arbitrating device and for making a decision on which fourth cell switch and which fifth cell switch ought to be used in transferring the cell.

The above bypass arbitrating device may comprise an additional transfer path detecting device for detecting an unused path between the second cell switches and the third cell switches based on the demanded cell number retained by the demanded cell number retaining device; an additional data retaining device for retaining a data which indicates an assignment status of a path between the fourth cell switches and the fifth cell switches; an additional path assignment demanding device for demanding an assignment of a path between at least one of the first cell switches and the third cell switches, the above one having the demanded cell number of at least 2; an additional path assigning device for assigning a path between the fourth cell switches and the fifth cell switches and a path between the fifth cell switches and the third cell switches based on the detection result of the additional transfer path detecting device, the data retained by the additional data retaining device and the demand of the additional path assignment demanding device; and an additional path data registering device for registering a data indicating the assigned path between the fourth cell switches and the fifth cell switches in the additional data retaining device.

The above objects are also fulfilled by a growable interconnect fabric cell switch module comprising a plurality of first cell switches for interconnecting cells; a plurality of second cell switches for interconnecting the cells outputted from the first cell switches; a plurality of third cell switches for interconnecting the cells outputted from the second cell switches; a plurality of fourth cell switches and a plurality of fifth switches for providing a bypass between the first cell switches and the second cell switches; and a bypass arbitrating device for making a decision on permission of the cell which is not permitted to be transferred by the path arbitrating device and for making a decision on which fourth cell switch and which fifth cell switch ought to be used in transferring the cell.

The above growable interconnect fabric cell switch module [N] may further comprise a plurality of fourth cell switches for receiving the cells through an identical input line; and a plurality of fifth cell switches for sending the cells sent from the fourth cell switches to an identical input line of each third cell switch.

In the above construction, the second and the third cell switches which, without the fourth and the fifth cell switches, would be unused due to the lack of the available paths between the first and the second cell switches are fully utilized.

Still another object of this invention is to offer a growable interconnect fabric cell switch module for transferring the concatenation-multiplexed cells properly.

The above object is fulfilled by the switch module [Q], in which each first cell switch further comprises a cell transfer controlling device for writing a plurality of cells inputted to the first cell switch into the cell queues in accordance with priority levels of the cells as well as simultaneously reading out a plurality of cells from the cell queues and sending the cells to the second cell switches, the second cell switches and the cells sent to the second cell switches having corresponding priority levels; and a cell output controlling device for, when the cells sent from the second cell switches simultaneously are received by one of the third cell switches, controlling the above one third cell switch to output the received cells in an order based on the priority levels of the second cell switches.

In the above construction, whichever second cell switch may be used for the transfer path, the waiting time of the cells in the queue buffer is short and the transfer order is never reversed. Accordingly, the concatenation-multiplexed cells are transferred properly.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 8 is a demanded cell number registering table;

FIG. 9 is a re-assignment demanding table;

FIG. 10 is an unused path supervising table;

FIG. 11 is a used path registering table;

FIG. 15 shows an example of a re-assignment order;

FIG. 19 is a demanded cell number registering table;

FIG. 20 is a sub assignment demanding table;

FIG. 21 is an unused path supervising table;

FIG. 22 is a used path registering table;

DESCRIPTION OF THE PREFERRED EMBODIMENTS

Embodiment I

Overall Construction and Operation

As a first embodiment of this invention, a 16×16 interconnect fabric cell switch module comprising twelve 4×4 switches will be described referring to FIGS. 3 through 17. Each 4×4 switch have a cell transfer capability of 155.52M bits/sec. The 16×16 module is chosen for this and the following embodiments for easier explanation.

Figure 1:
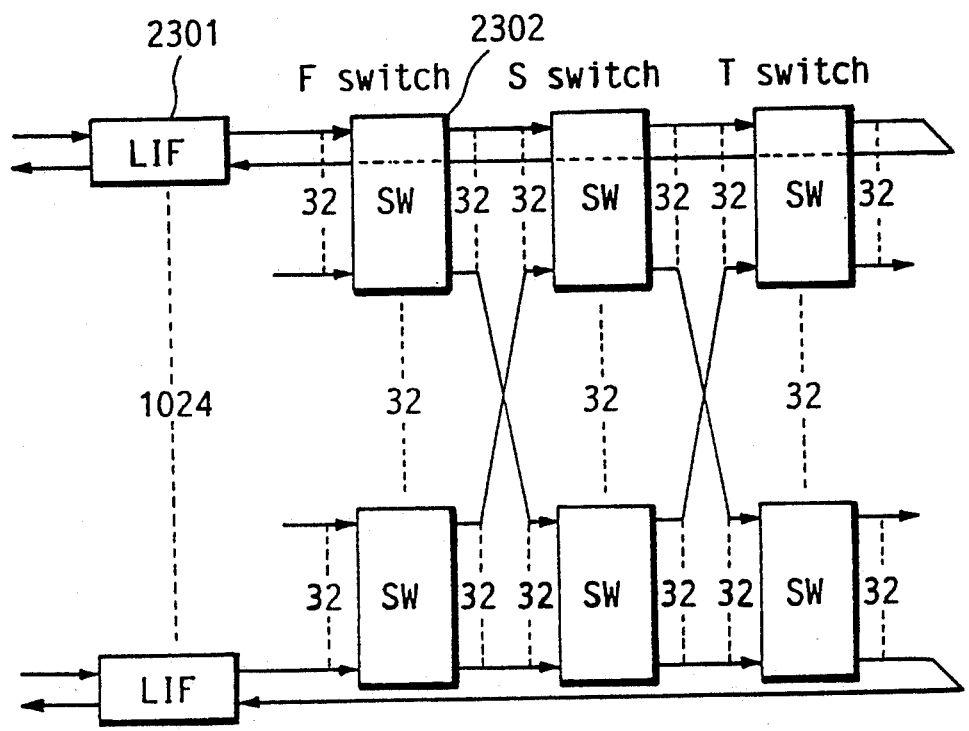
FIG. 1 shows a construction of an ATM switching board used in an ATM switching board channel system.
Figure 2:
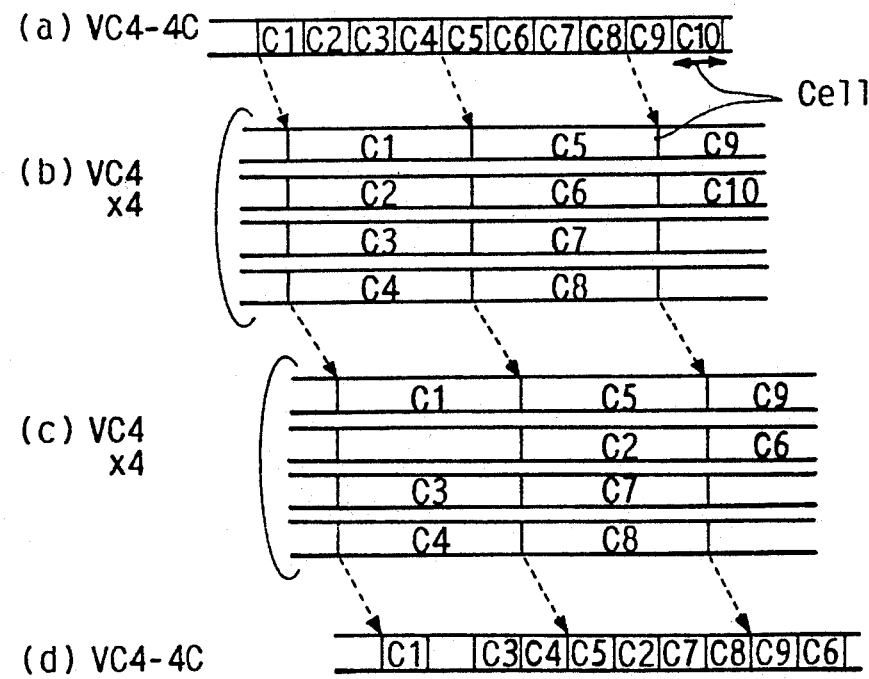
FIGS. 2a through 2d explain how a VC4-4C signal of is transferred by use of a switching board having only a transfer speed for VC4 signals.
Figure 3:
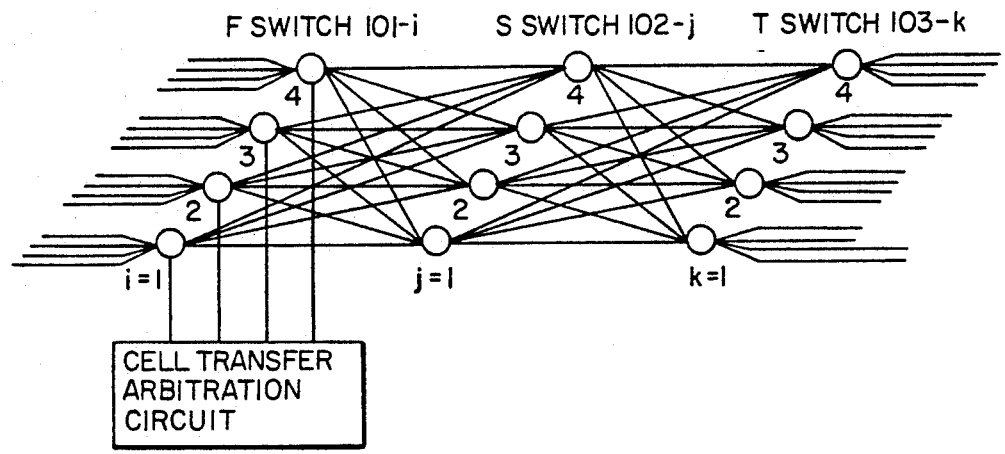
FIG. 3 is a schematic view of a growable interconnect fabric cell switch module of a first embodiment.

As schematically shown in FIG. 3, the 16×16 cell switch module comprises four F switches 101-i (i=1 through 4), four S switches 102-j (j=1 through 4), four T switches 103-k (k=1 through 4) and a cell transfer arbitration circuit 104. The cell transfer arbitration circuit 104 is provided for arbitrating which F switch 101-i ought to transfer a cell to which S switch 102-j in response to a demand of each F switch 101-i. Since it is prevented that cells destined to an identical T switch 103-k are sent to one S switch 102-j owing to the circuit 104, there can be no cell waiting to go to the T switch 103-k. Accordingly, the S switches 102-j requires no queue buffers.

Figure 4:
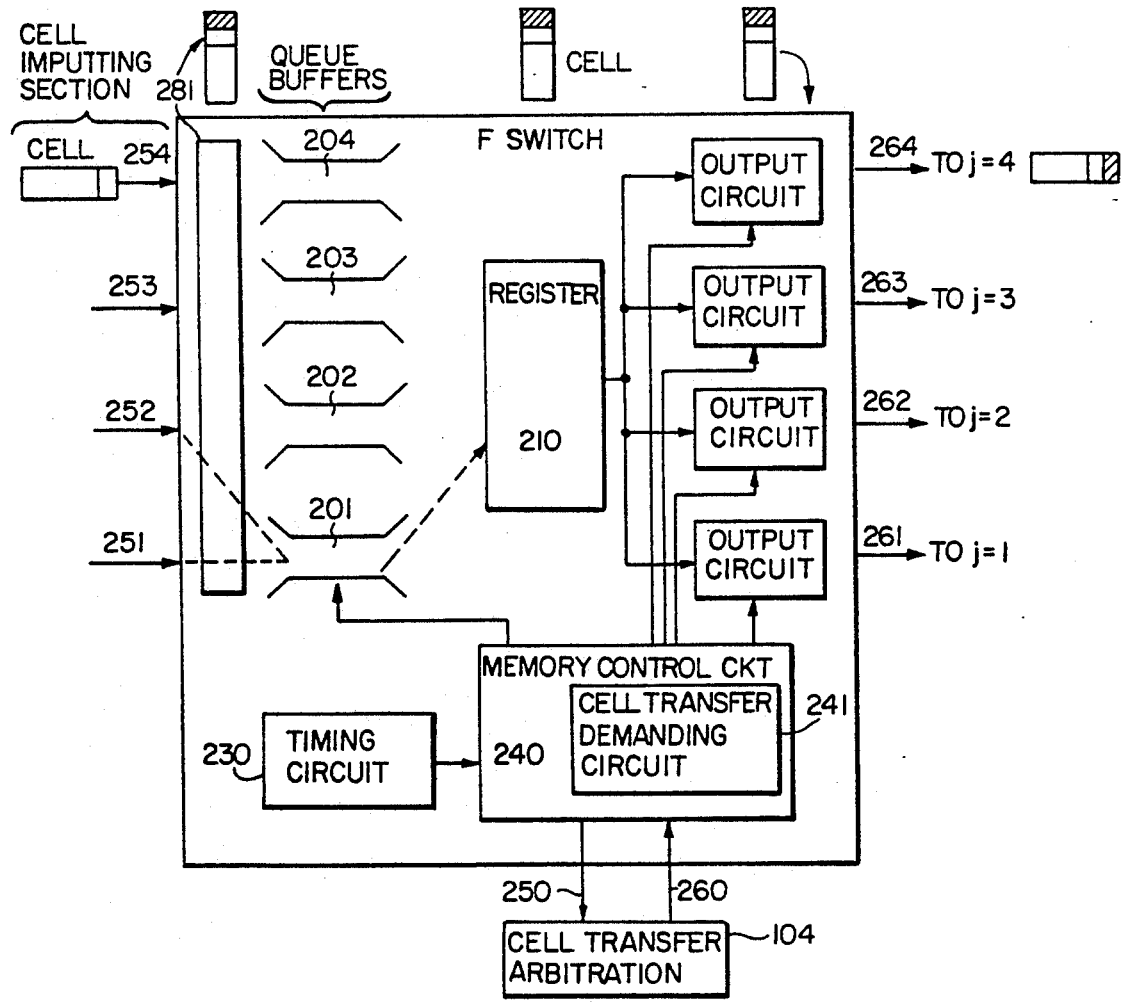
FIG. 4 is a block diagram of an F switch 101-i.

As shown in FIG. 4, each F switch 101-i comprises queue buffers 201 through 204, a register 210, output circuits 221 through 224, a timing circuit 230, a memory control circuit 240 and a cell inputting section 281.

The above elements of the F switch 101-i function as follows.

The cell inputting section 281 receives cells through input lines 251 through 254, each cell being formed of a 53 octet serial data including a cell header. Then, the section 281 converts the cells into parallel so that the cells can be transferred within the F switch 101-i in 1 clock. The section 281 also analyzes the cell header of each cell, adds an 11 octet routing header to the cell, and send the cell to the queue buffer corresponding to the T switch 103-k which is to receive the cell (for example, to the queue buffer 201 if k=1 and to the queue buffer 202 if k=2). Each queue buffer is supervised in association with the T switch 103-k corresponding thereto.

The register 210, when commanded by the memory control circuit 240, reads out four cells at the maximum serially from the queue buffers 201 through 204 within a time required to transfer one cell, and sends each cell to the output circuit corresponding to the S switch 102-j which is to receive the cell. (The time required to transfer one cell will be referred to as the cell transferring time.)

The output circuits 221 through 224 each reads the cell from the register 210 in 1 clock when receiving a load signal from the memory control circuit 240, and sends the cell to the S switch 102-j with a 64 byte-clock cycle through one of output lines 261 through 264, the one corresponding to the S switch 102-j which is to receive the cell.

The timing circuit 230 gives a timing signal to the above elements by use of a cell period counter, whereby controlling the timing of writing the cell into the queue buffers 201 through 204 and of outputting the cells to the S switches 102-j.

A cell transfer demanding circuit 241 in the memory control circuit 240 determines a number of the cells which are to be sent from each queue buffer to the S switches 102-j (namely, the number of cells which are to be sent to each T switch 103-k). The memory control circuit 240 notifies the cell transfer arbitration circuit 104 of the determined numbers through a line 250. In addition, the circuit 240 controls the transfer of the cells accumulated in the queue buffers 201 through 204 when receiving a cell transfer permitting signal through a line 260. The cell transfer permitting signal indicates which S switch 102-j ought to receive the cell from which queue buffer.

The numbers determined by the circuit 241, each of which is four at the maximum, are almost in the same ratio as the numbers of the cells accumulated in the queue buffers 201 through 204. If the numbers of the cells accumulated in the queue buffers 201 through 204 are respectively 4, 2, 2, and 1, for instance, the numbers determined by the circuit 241 are 2, 1, 1 and 0. Owing to the above control, the maximum number of the cells among those remaining in the queue buffers 201 through 204 can be as small as possible.

The memory control circuit 240 carries out the following control to certify the transfer order of the cells after the cells are concatenation-multiplexed.

If, for example, the cells A and B are to be concatenation-multiplexed and sent to the T switch 103-1, the cell A sent through the line 251 is accumulated in the queue buffer 201 earlier than the cell B sent through the line 252. Consequently, the cell A is sent to the output line earlier than the cell B if one cell is permitted to be sent to the T switch 103-1. (In practice, the cell A is inputted to the F switch 101-i earlier than the cell B by a time required to transfer one cell before the cells are concatenation-de-multiplexed.) Owing to this control, the transfer order of the cells A and B is never reversed.

As for sending the cells in the queue buffer 201 to the output lines 261 through 264, the cell which is accumulated in the queue buffer 201 earlier is sent to the output line which corresponds to the S switch 102-j having a smaller value of j. Each T switch 103-k, when receiving the cells from a plurality of S switches 102-j, is controlled to process the cell from the S switch having a smaller value of j with a higher priority. Therefore, the transfer order of the cells which are inputted to the F switch 101-i through an identical input line is never reversed.

It is apparent from the above that the order of the concatenation-multiplexed cells is never reversed although there occurs a period in which no cell is outputted from the T switch 103-k.

The above relationship between the order of cell accumulation and the value of j is not mandatory, if only the order of cell accumulation is in correspondence with the order of cell processing of the T switch 103-k.

Figure 5:
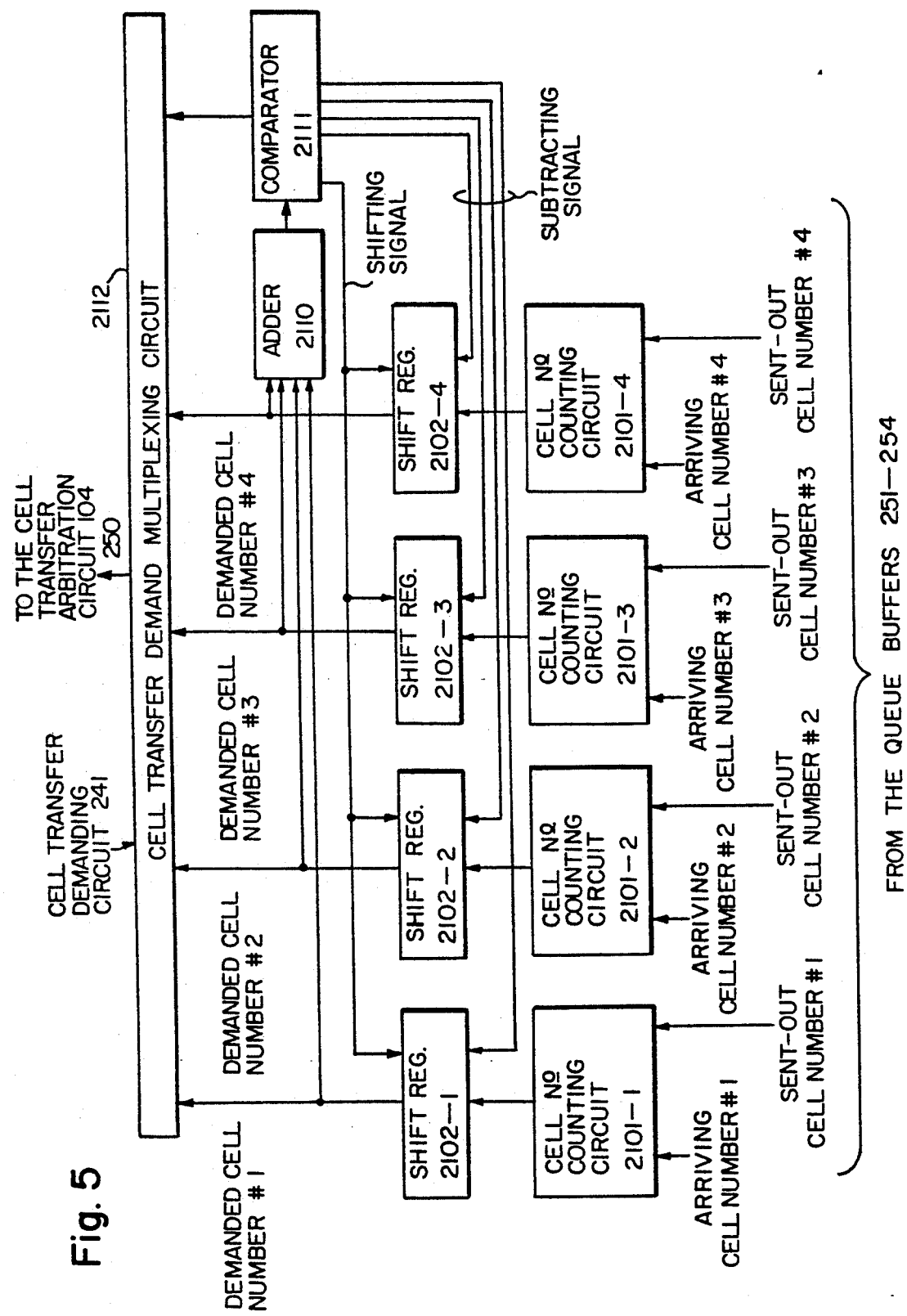
FIG. 5 is a circuit diagram of a cell transfer demanding circuit 241.

As shown in FIG. 5, the cell transfer demanding circuit 241 comprises cell number counting circuits 2101-1 through 2101-4, shift registers 2102-1 through 2102-4, an adder 2110 and a comparator 2111. A cell transfer demanding operation is done as follows.

The cell number counting circuits 2101-1 through 2101-4 count and retain the numbers of the cells accumulated in the queue buffers 201 through 204, respectively. (Such numbers will be referred to as the accumulated cell numbers #1 through #4.)

The circuit 2101-1, for example, adds the number of the cells sent to the queue buffer 201 to the number of the cells which have already been accumulated in the queue buffer 201. The circuit 2101-1 also subtracts the number of the cells sent out from the queue buffer 201 to the S switches 102-j from the accumulated cell number #1. (The numbers of the cells sent to the queue buffers 201 through 204 will be referred to as the arriving cell numbers #1 through #4, and the numbers of the cells sent out from the queue buffers 201 through 204 to the S switches 102-j will be referred to as the sent-out cell numbers #1 through #4.)

The shift registers 2102-1 through 2102-4 output the demanded cell numbers #1 through #4. The demanded cell number #1, for instance, is the number of the cells which are demanded to be transferred from the F switch 101-i to the T switch 103-1. The demanded cell number #1 is obtained by shifting the accumulated cell number #1 to the right by 4 bits and then shifting the obtained value to the left by "n" bits. "n" is the number of shifting signals outputted from the comparator 2111.

Figures 6, 7:
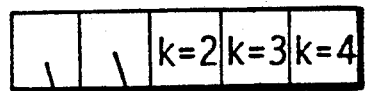
FIG. 6 is a table showing an operation of a shift register 2102 of the cell transfer demanding circuit 241.
FIG. 7 shows a format of a cell transfer demanding signal.

If the shift register 2102-1 receives values D3, D2, D1 and D0 as the accumulated cell number #1 as shown in FIG. 6, values Q3, Q2, Q1 and Q0 are outputted each time the shifting signal is inputted. The values Q3, Q2, Q1 and Q0 are obtained by dividing the accumulated cell number #1 by $2^{4-n}$.

The shift registers 2102-1 through 2102-4 also subtract 1 each from the demanded cell numbers #1 through 4 when receiving a subtracting signal from the comparator 2111.

If the accumulated cell number #1 is 6 (D3, D2, D1, D0=[0, 1, 1, 0]), the shift register 2102-1 outputs 0 (Q3, Q2, Q1, Q0=[0, 0, 0, 0]) after a first shifting, 1 (Q3, Q2, Q1, Q0=[0, 0, 0, 1]) after a second shifting and 3 (the values Q3, Q2, Q1, Q0=[0, 0, 1, 1]) after a third shifting. If the subtracting signal is sent from the comparator 2111 at this time, the shift register 2102-1 outputs 2 (=3-1).

The adder 2110 obtains a sum of the values outputted from the shift registers 2102-1 through 2102-4 and sends the sum to the comparator 2111.

The comparator 2111 compares the sum with 4. If the sum is smaller than 4, one shifting signal is outputted each to the shift registers 2102-1 through 2102-4 until the sum gets 4 or more. The shifting signal can be sent four times at the maximum. If the sum is larger than 4, how much larger the sum is than 4 is obtained. The subtracting signals in the number of the obtained value are outputted randomly. Each shift register which receives the subtracting signal subtracts 1 from the accumulated cell number thereof. As a result, the sum equals 4, and the cell transfer demanding operation is stopped.

The value outputted from any one of the shift registers is larger than 4, the value from the above one of the shift registers is automatically reduced to 4 and the subtracting signal is sent from the comparator 2111 to other three shift registers in order to zero the values from these three shift registers. In this way, the cell transfer demanding operation is stopped.

If the sum is still smaller than 4 after the shifting signal is outputted four times, the cell transfer demanding operation is stopped.

After the cell transfer demanding operation is stopped in any of the above circumstances, the comparator 2111 sends a valid signal to a cell transfer demand multiplexing circuit 2112, the valid signal indicating that the demanded cell numbers #1 through #4 are valid.

Then, the cell transfer demand multiplexing circuit 2112 time-division-multiplexes a frame synchronizing pattern and the demanded cell numbers #1 through #4 as shown in FIG. 7 and sends the result to the cell transfer arbitration circuit 104.

Each S switch 102-j has the same construction as the F switch 101-i except the followings.

The cell inputting section 281 thereof adds no routing header but analyzes the routing header added in the F switch 101-i. The queue buffers 201 through 204 are not provided. The memory control circuit 240 thereof does not send to or receive from the cell transfer arbitration circuit 104 a signal, but controls the register 210 thereof to output the cells to the output circuit which is indicated by the routing header.

Each T switch 103-k also has the same construction as the F switch 101-i except the followings.

The cell inputting section 281 thereof adds no routing header but analyzes the routing header added in the F switch 101-i. The memory control circuit 240 thereof does not send to or receive from the cell transfer arbitration circuit 104 a signal, but controls the register 210 thereof to output the cells sent from the S switch having a smaller value of j, with a higher priority, to the output circuit. The output circuits 221 through 224 thereof execute a parallel-to-serial conversion and also remove the routing header, whereby outputting a 53 octet cell.

Since the F, S and T switches have the similar construction and functions as described above, a same type of switches may be employed for any of these switches by setting specified signals.

Arbitration Algorithm and Re-Assignment Operation

FIGS. 8 through 11 show an arbitration algorithm of the circuit 104 for arbitrating cell transfer paths based on the demanded cell numbers #1 through #4. The cell transfer paths comprise paths between the F switches 101-i and S switches 102-j and paths between the S switches 102-j and the T switches 103-k.

FIG. 8 is a demanded cell number registering table, which exemplifies the demanded cell numbers outputted by the cell transfer demanding circuit 241. The shaded block indicates that three cells are demanded to be transferred from the F switch 101-2 to the T switch 103-2. Each numeral for j is an example of the S switch 102-j which is assigned as the default initially. Namely, the (i=2, j=1, k=2) path is assigned as the default. (In the same manner, the numerals in the blocks are default values in FIGS. 8 through 10.)

It is obvious from FIG. 8 that the cells are not delayed or conflict with one another if each cell is transferred through the path assigned as the default when only one cell is to be sent from one F switch 101-i to one T switch 103-k.

However, such a transfer is ineffective. Even if three cells are demanded for the (i=2, k=2) transfer as in the shaded block, only one cell is transferred within the cell transferring time, resulting in a low delay-throughput.

Since no cell is demanded for the (i=2, k=4) and (i=4, k=2) transfer, the (i=2, j=3) and (j=3, k=2) default paths are unused. If such unused paths are employed with a different combination from the default, it is highly possible more cells are transferred from the F switch 101-2 to the T switch 103-2. In order to realize this, the unused paths are re-assigned as follows.

First, tables shown in FIGS. 9 through 11 are prepared.

FIG. 9 is a re-assignment demanding table, which shows the number of the cells which demand the reassignment of the unused paths. The number in each block is smaller than the number of the corresponding block of FIG. 8 by 1 since one cell has already been transferred through the default path.

FIG. 10 is an unused path supervising table, which shows the unused paths between the S switches 102-j and the T switches 103-k. The unused paths, which are marked with "*", correspond to the blocks of FIG. 8 which hold "0". Although FIG. 10 shows that the paths between the F switches 101-i and the S switches 102-j corresponding to the blocks with "*" are unused, this table is not used to retrieve such paths.

FIG. 11 is a used path registering table, which shows the used paths between the F switches 101-i and the S switches 102-j and the destinations (T switches 103-k) of the cells which are to be transferred through such used paths.

After FIGS. 9 through 11 are prepared, the reassignment is effected in the following way.

(1) The unused path between the S switches 102-j and the T switches 103-k is retrieved from FIG. 10 in the order of k=1 to k=4 and i=1 to i=4.

(2) Among the cells which demand the re-assignment of the unused paths, the one which has the T switch 103-k retrieved in (1) as the destination is retrieved from FIG. 9, and the source (F switch 101-i) of such a cell is obtained.

(3) Whether the path between the F switch 101-i obtained in (2) and the S switch 102-j obtained in (1) is available or not is judged by FIG. 11.

(4) If such a path is available, the re-assignment is possible.

4-1) 1 is subtracted from the number in the block of FIG. 9 used in (2).

4-2) The mark "*" of FIG. 10 retrieved in (1) is deleted.

4-3) The destination (T switch 103-k) of the cell to transfer is registered in the corresponding block of FIG. 11.

4-4) Execute 1) through 4-3) for all the unused paths.

5) If the path is not available in (3), the operation of (1) and thereafter is repeated for all the other unused paths until an available path is found.

A practical example will follow.

(1) Among the paths marked with "*", the (j=2, k=1) path is the first to retrieve.

(2) FIG. 9 shows that there is one cell which demands the re-assignment and is destined to the T switch 103-1. The source of such a cell is the F switch 101-1.

(3) As shown in FIG. 11, the (i=1, j=2) path, which is necessary to transfer the above cell, is already used. The re-assignment cannot be done.

(5) Accordingly, the operation of (1) to (3) is repeated.

(1) The third time, the (j=3, k=2) is retrieved from FIG. 10.

(2) FIG. 9 shows that there are two cells which demands the re-assignment and are destined to the T switch 103-2. The source of such cells is the F switch 101-2.

(3) As the (i=2, j=3) path, which is necessary to transfer the above cell, is available as shown in FIG. 11, the re-assignment can be done.

(4) The (i=2, j=3, k=2) path is re-assigned in accordance with the above 4-1) through 4-3). The operation of (1) through (3) is still repeated, and the (i=4, j=3, k=4) paths is also re-assigned.

After the re-assignment is completed, FIGS. 9 and 11 are changed as shown with the arrows. This means the reassignment allows the transfer of two more cells.

Cell Transfer Arbitration Circuit 104

Figure 12A:
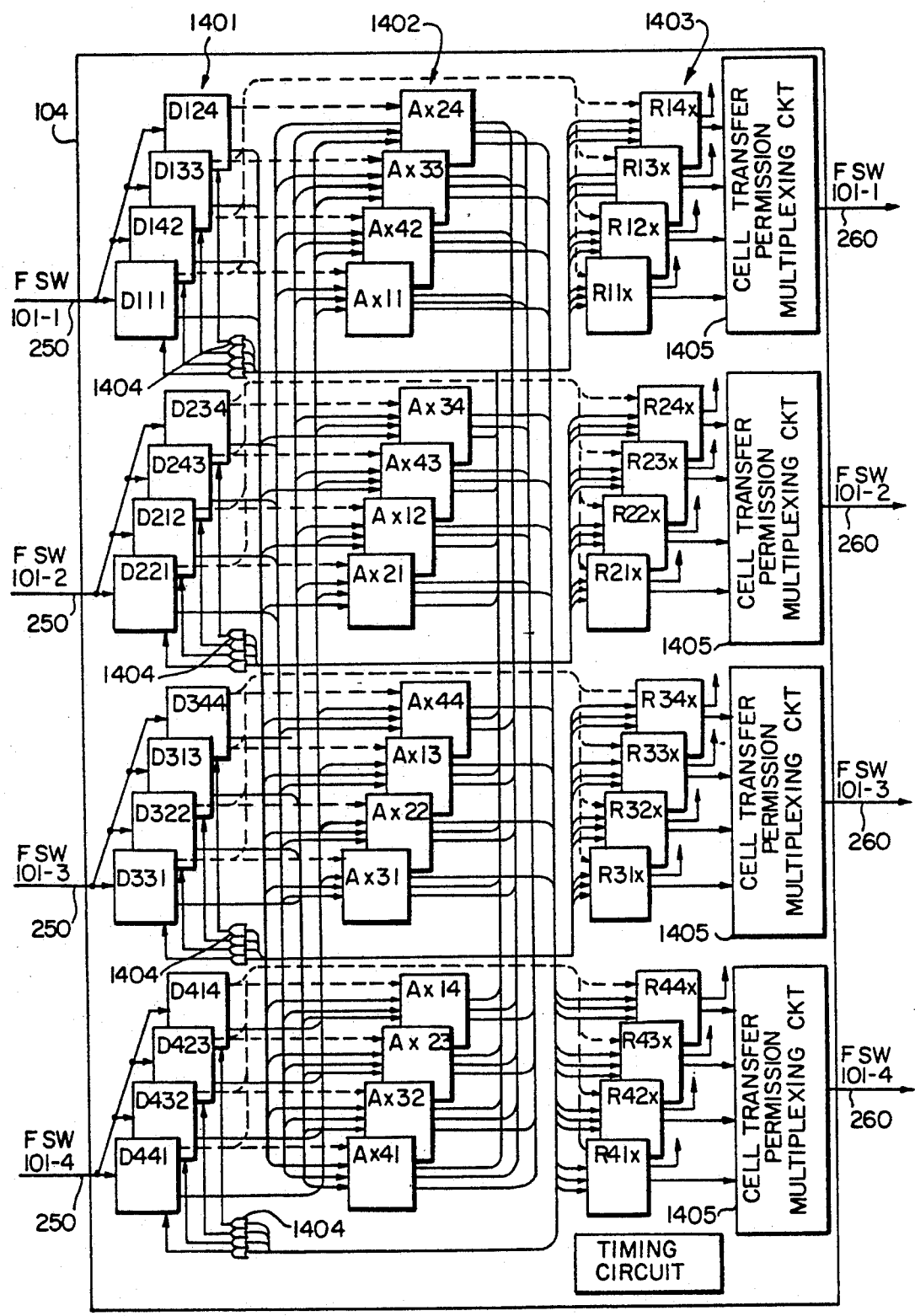
FIGS. 12a through 12e are circuit diagrams of the cell transfer arbitration circuit 104.
Figure 12B:
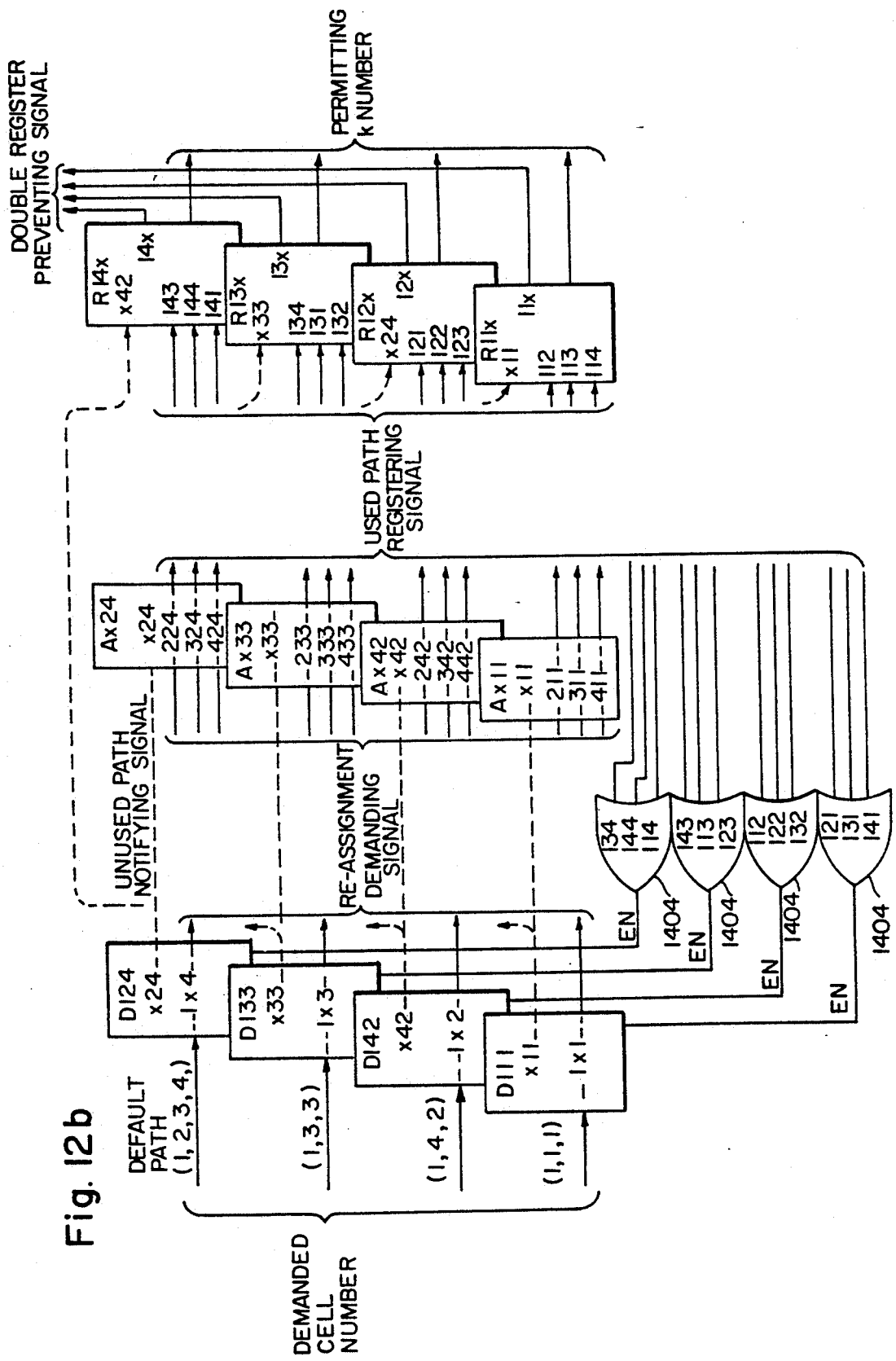
Figure 12C:
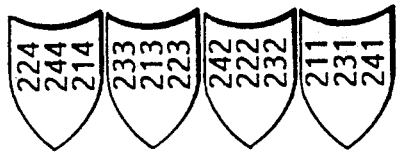
Figure 12D:
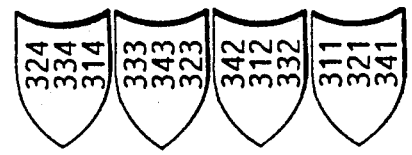
Figure 12E:
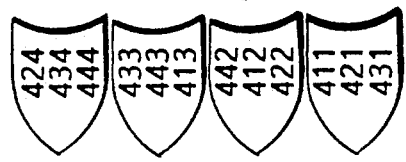

FIGS. 12a shows an overall circuit construction of the cell transfer arbitration circuit 104. FIGS. 12b through 12e are each a partial view of FIG. 12a. Since FIGS. 12c through 12e are the same as FIG. 12b except circuit names, FIGS. 12c through 12e show only the circuit names schematically. The circuit 104 comprises a demanded cell number registering circuit group 1401, an unused path re-assigning circuit group 1402, a used path registering circuit group 1403, an OR circuit group 1404, a cell transfer permission multiplexing circuit 1405 and a timing circuit 1406.

The circuit group 1401 comprises 16 demanded cell number registering circuits D, the group 1402 16 unused path re-assigning circuits A, and the group 1403 16 used path registering circuits R.

Figure 13A:
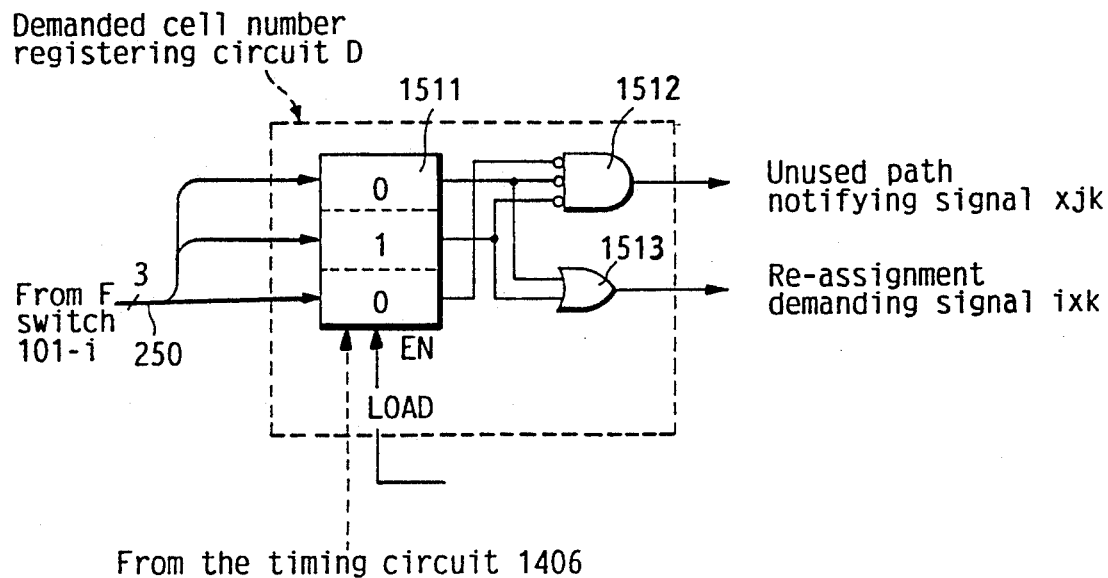
FIG. 13a is a circuit diagram of a demanded cell number registering circuit D.
Figure 13B:
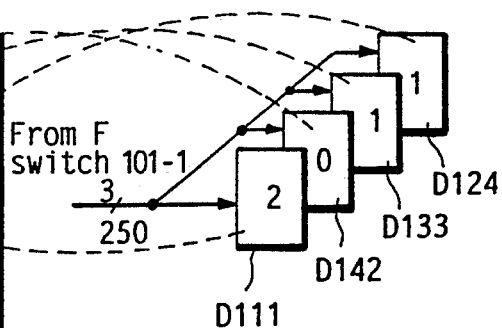
FIG. 13b shows the relationship between the demanded cell number circuit D and FIG. 8.

As shown in FIG. 13a, each demanded cell number registering circuit D comprises a 3-bit down counter 1511 with a load terminal, an AND circuit 1512 and an OR circuit 1513. As shown in FIG. 13b, each circuit D corresponds to a portion of FIG. 8, and each down counter 1511 holds the corresponding demanded cell number. For example, the down counter 1511 of the demanded cell number registering circuit D111 holds the number of the cells which are demanded to be transferred through the (i=1, j=1, k=1) path.

When the demanded cell numbers #1 through #4 of the F switches 101-1 are time-division-multiplexed and sent to the circuit 104, the down counters 1511 of the demanded cell number registering circuits D111, D142, D133 and D124 hold the demanded cell numbers #1 through #4 of the F switch 101-1 respectively and serially in response to a load signal sent from the timing circuit 1406.

The AND circuit 1512 outputs a "high" signal as an unused path notifying signal when all bits of the counting result of the down counter 1511 are 0 (the demanded cell number=0), whereby notifying the corresponding path is unused.

The OR circuit 1513 outputs a "high" signal as a reassignment demanding signal when at least either one of the upper two bits of the counting result of the down counters 1511 is 1 (the demanded cell number=2 or more).

When the down counter 1511 of the circuit D111 retains 0, no cell is transferred through the (i=1, j=1, k=1) default path. Accordingly, the unused path notifying signal x11 is outputted to signify that the (j=1, k=1) path is unused. ("x" can be replaced with any number, hereinafter.)

When the above down counter 1511 retains 2, there remains one cell which cannot be transferred through the (i=1, j=1, k=1) default path. Accordingly, the re-assignment demanding signal 1×1 is outputted to demand the re-assignment of any path from the F switch 101-1 (i=1) to the T switch 103-1 (k=1).

The unused path notifying signal x42 outputted from the circuit D142 indicates that the (j=4, k=2) path is unused, and the re-assignment demanding signal 1×2 which are also outputted from the circuit D142 demands the re assignment of any path from the F switch 101-1 (i=1) to the T switch 103-2 (k=2).

The other circuits D function in the same manner.

Additionally, when the re-assignment is carried out and an enable signal EN is inputted, the down counter 1511 decrements the demanded cell number held therein. Furthermore, when the demanded call number O notifies that, for example, the (j=1, k=1) path is unused and the other demanded cell number registering circuits D demand reassigning, the (j=1, k=1) path is assigned in response to the demand. Consequently, the down counter 1511, when receiving a used path registering signal described later, increments the demanded cell number to 1 to notify that the (j=1, k=1) path is used.

Figure 14:
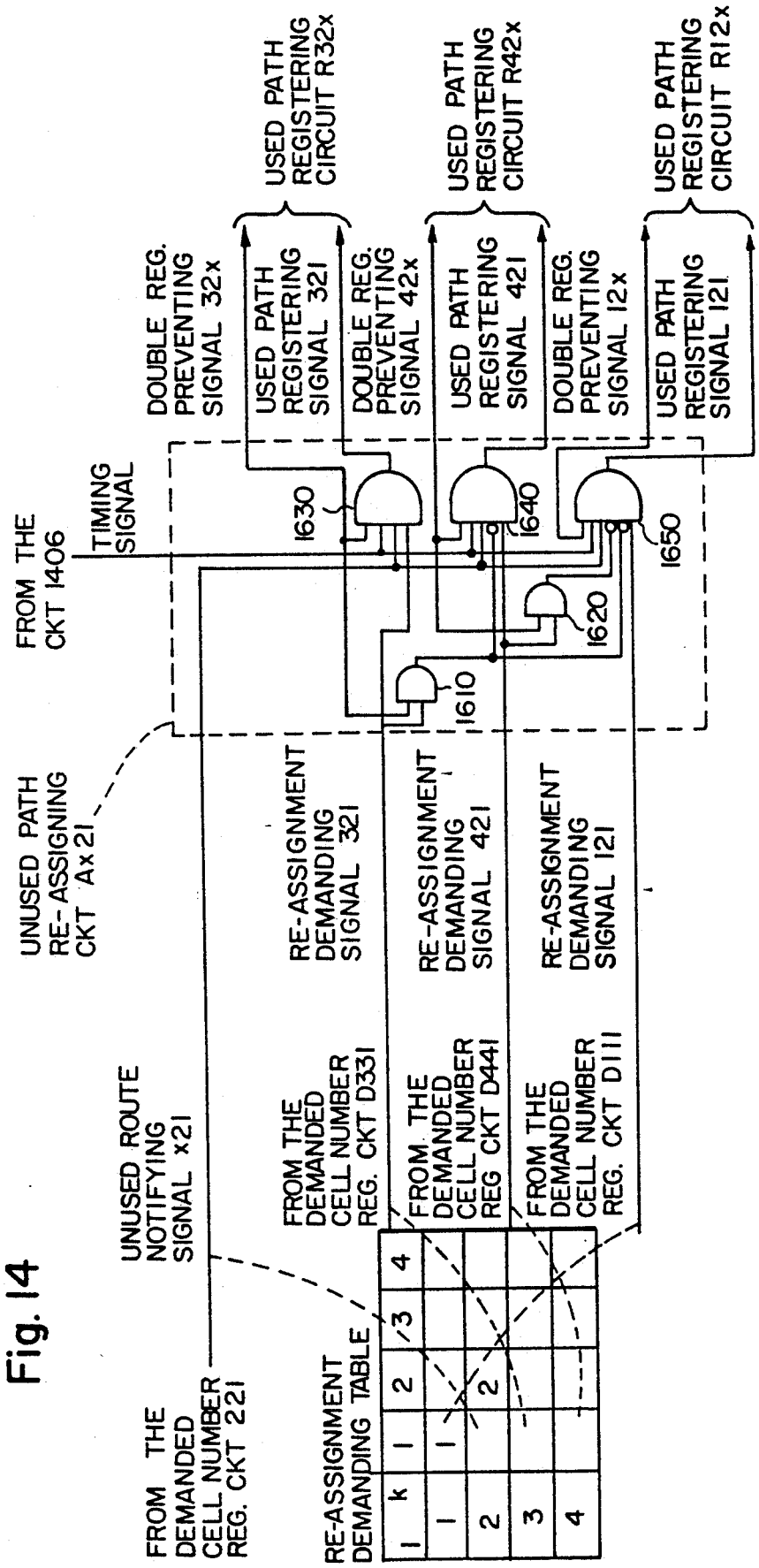
FIG. 14 is a circuit diagram of an unused path reassigning circuit A.

As shown in FIG. 14, each unused path re-assigning circuit A comprises five AND circuits 1610, 1620, 1630, 1640 and 1650. The circuits A re-assign the unused paths based on the unused path notifying signals, the re-assignment demanding signals both from the circuits D and double register preventing signals from the circuits R.

The unused path re-assigning circuit Ax21 receives the unused path notifying signal x21 from the circuit D221 as well as the re-assignment demanding signals 321, 421 and 121 respectively outputted from the circuits D111, D331 and D441.

The unused path re-assigning circuit Ax21 re-assigns the (j=2, k=1) path. The unused path re-assigning signal x21 indicates that the (j=2, k=1) path is unused. The re-assignment demanding signals 321, 421 and 121 respectively indicate whether there are cells which demand the re-assignment of the paths from the F switch 101-3 to the T switch 103-1, from the F switch 101-4 to the T switch 103-1, and from the F switch 101-1 to the T switch 103-1. If any of such paths can be re-assigned, the AND circuits 1630, 1640 or 1650 output a used path registering signal. The used path registering signal is a logical product of the signals x21 by 321, of the signals x21 by 421, or of the signals x21 by 121.

It should be noted that the signals 321, 421 and 121, which are inputted to the circuit Ax21, are outputted from the circuits D111, D331 and D441 as the signals 3x1, 4x1 and 1x1.

The used path registering circuits R32x, R42x and R12x send the double register preventing signals 32x, 42x and 12x to the AND circuits 1630, 1640 and 1650, respectively, whereby showing the re-assignment is possible. In other words, the re-assignment is effected only when a line which is necessary for the (j=2, k=1) transfer, namely, any one of the (i=3, j=2) (i=4, j=2) and (i=1, j=2) paths, is unused.

As for the double register preventing signals, the re-assignment is permitted when the signal is "high" whereas the re-assignment is prohibited when the signal is "low".

In the circuit Ax21 of FIG. 14, the unused path notifying signal x21 is "high" whereas the re-assignment demanding signals 321 and 421 are "low". The re-assignment demanding signal 121 is "high" whereas the double register preventing signal 12x is "low". Accordingly, no re-assignment is permitted.

Even if two or three of the above paths can be re-assigned, such paths are prevented from being re-assigned simultaneously. The AND circuits 1630, 1640 and 1650 receive re-assignment priority signals, which indicates priority levels of the paths. The path with a higher priority level is re-assigned prior to the paths with lower priority levels.

If the double register preventing signal 12x is "high", the used path registering signal 121 from the AND circuit 1650 is "high". Then, the (i=1, j=2, k=1) path is re-assigned. The used path registering signals 121, 131 and 141 are inputted to the demanded cell number registering circuit D111 as enable signals EN through the OR circuits 1404. Since the used path registering signal 121 is "high", the demanded cell number of the (i=1, k=1) block is decremented as mentioned before. The used path registering signal 121 is inputted to the demanded cell number registering circuit D221 together with the used path registering signals 321 and 421 through the unillustrated OR circuits and, accordingly, the demanded cell number is incremented as mentioned above to change the unused path notifying signal x21 to "high."

The used path registering signal 121 is also inputted to the used path registering circuit R12x as a hold signal of the used path registering circuit R12x, whereby registering the usage of the (i=1, j=2) path.

Re-Assignment Timing

How the re-assignment is timed will be explained hereinafter.

The AND circuits 1630, 1640 and 1650 each receive a timing signal from the timing circuit 1406. The re-assignment is carried out only when the timing signal is "high".

All the unused path re-assigning circuits A cannot carry out the re-assignment simultaneously. If one identical path can be re-assigned by two or more different re-assignment demands or if two or more paths can be re-assigned by one re-assignment demand, the re-assignment cannot be done properly.

For example, the unused path re-assigning circuits Ax11, Ax42, Ax33 and Ax24 (shown as partially overlapped in FIG. 12a) all re-assign different combinations of paths. Accordingly, these circuits can be operated simultaneously. The circuits Ax11, Ax21, Ax31 and Ax41 (fully shown in FIG. 12a) cannot be operated simultaneously since these circuits possibly re-assign a plurality of paths having the same source (the F switch 101-1) and destination (the T switch 103-1) for one identical cell transfer demand. Nor can the circuits Ax11, Ax12 and Ax13 be operated simultaneously since these circuits possibly re-assign a plurality of paths having the same F switch 101-1 and S switch 102-1.

The timing circuit 1406 carries out the following control to realize fast and accurate re-assignment with no such restriction.

The demanded cell number outputted from each F switch 101-i is time-division-multiplexed and sent in 4 clocks in the order of k=1 to k=4.

When four demanded cell numbers #1 for the T switch 103-1 are sent from the F switches 101-1 through 4 to the cell transfer arbitration circuit 104 in the 1st clock, the demanded cell numbers #1 are registered in the demanded cell number registering circuits D111, D221, D331 and D441, respectively. Therefore, the unused path re-assigning circuit Ax11 can effect the re-assignment.

When four demanded cell numbers #2 for T switch 103-2 are sent from the F switches 102-2 to the circuit 104 in the 2nd clock, the demanded cell numbers #1 and #2 are registered in the circuits D142, D212, D322 and D432. Therefore, the unused path re-assigning circuits Ax21 and Ax12 can effect the re-assignment.

Figure 15:
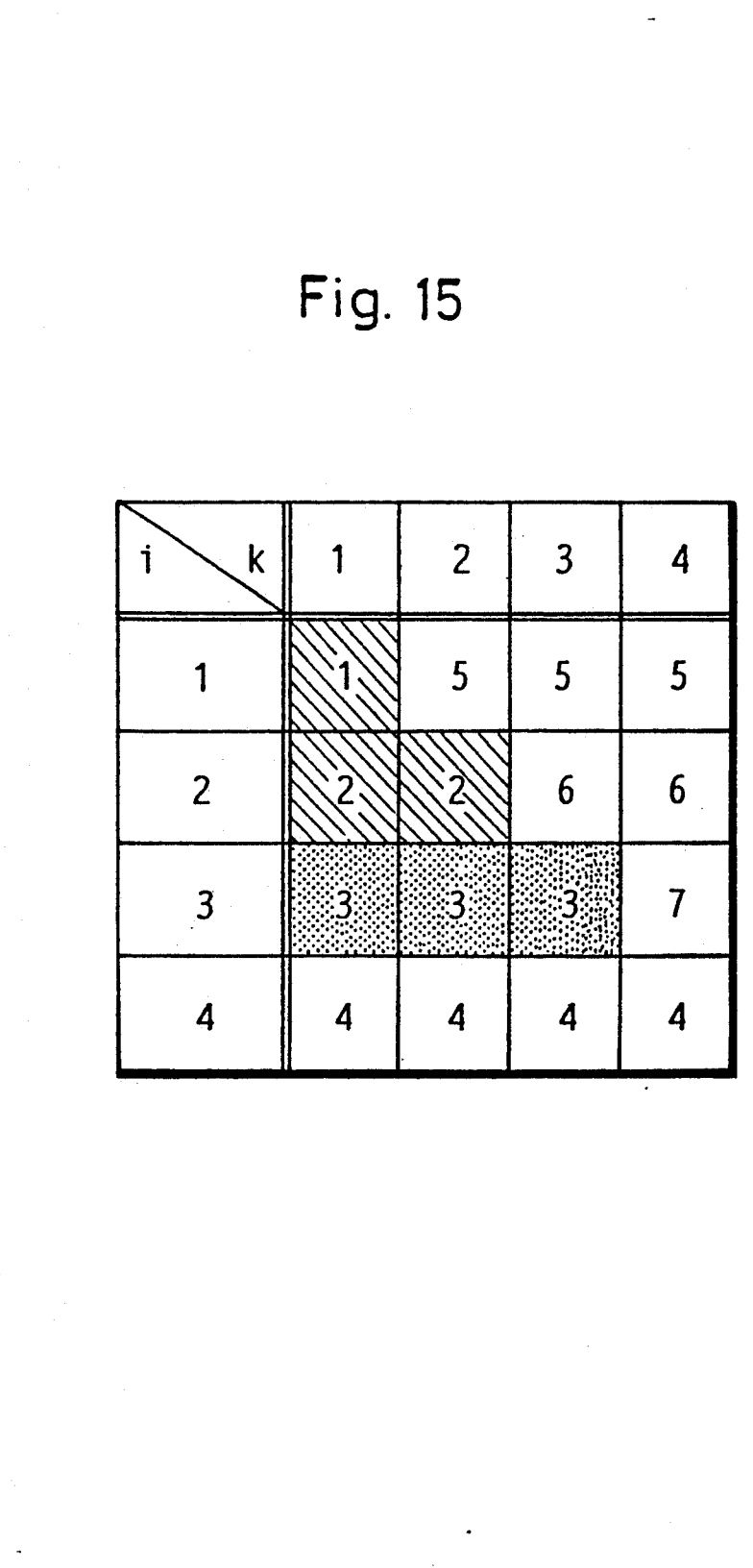

FIG. 15 shows such an order of re-assignment. "1" in the (i=1, k=1) block signifies that the (j=1, k=1) path, which is the default of from F switch 101-1 to the T switch 103-1, is re-assigned first (this re-assignment timing will be referred to as a first re-assigning timing). "2" in the (i=2, k=1) and (i=2, k=2) blocks signify that the (i=2, k=1) and (i=2, k=2) paths, which are respectively the default from F switch 101-2 to the T switch 103-1 and from the F switch 101-2 to the T switch 103-2 are re-assigned next (a second re-assigning timing). In the same manner, the other numerals "3" through "7" indicate the order of the re-assignment for the respective paths. The re-assignment of all the paths bearing "1" through "7" of FIG. 15 is referred to as one cycle.

Since all the 16 demanded cell numbers #1 through #4 have been registered in the circuits D by the time the paths bearing "5" are re-assigned, the F switches 101-i are ready to output the demanded cell numbers #1 through #4 for the next cycle of cell re-assignment. If two cell transfer arbitration circuits 104 are provided, the path bearing "5" of a first cycle and the path bearing "1" of a second cycle are re-assigned simultaneously. As a result, one re-assignment cycle, which takes 7 clocks, can be considered to take only 4 clocks.

Instead of re-assigning the paths in series each time a demanded cell number for each T switch 103-k is outputted, the unused paths may be re-assigned by operating four unused path re-assigning circuits A four times after all the demanded cell numbers are outputted. For instance, a timing signal to the circuit Ax11 is inputted as a first timing signal, and timing signals to the circuits Ax21 and Ax12 are inputted as the second timing signals.

If the re-assignment is always carried out in the order in FIG. 15, certain paths are given priority to the other paths. For example, the path from any S switch to the T switch 103-1 is always re-assigned prior to the path to the T switch 103-4.

Such an inconvenience can be prevented by changing the re-assigning order of the path leading to the T switch 103-k, instead of always re-assigning the path to the T switch 103-1 first. The T switch to deal with first can be determined randomly, or changed in an order as follows. If the T switch 103-k is first dealt with in the first cycle, for example, the T switch 103-k' is handled first in the second cycle. k'=(k+m). If k'>4, k'=k+m-4. "m" and 4 are integers having no common divisor. Such a change can be done easily by mainly exchanging the timings of outputting control signals sent from the timing circuit 1406.

Used Path Registering Circuits R

Figure 16:
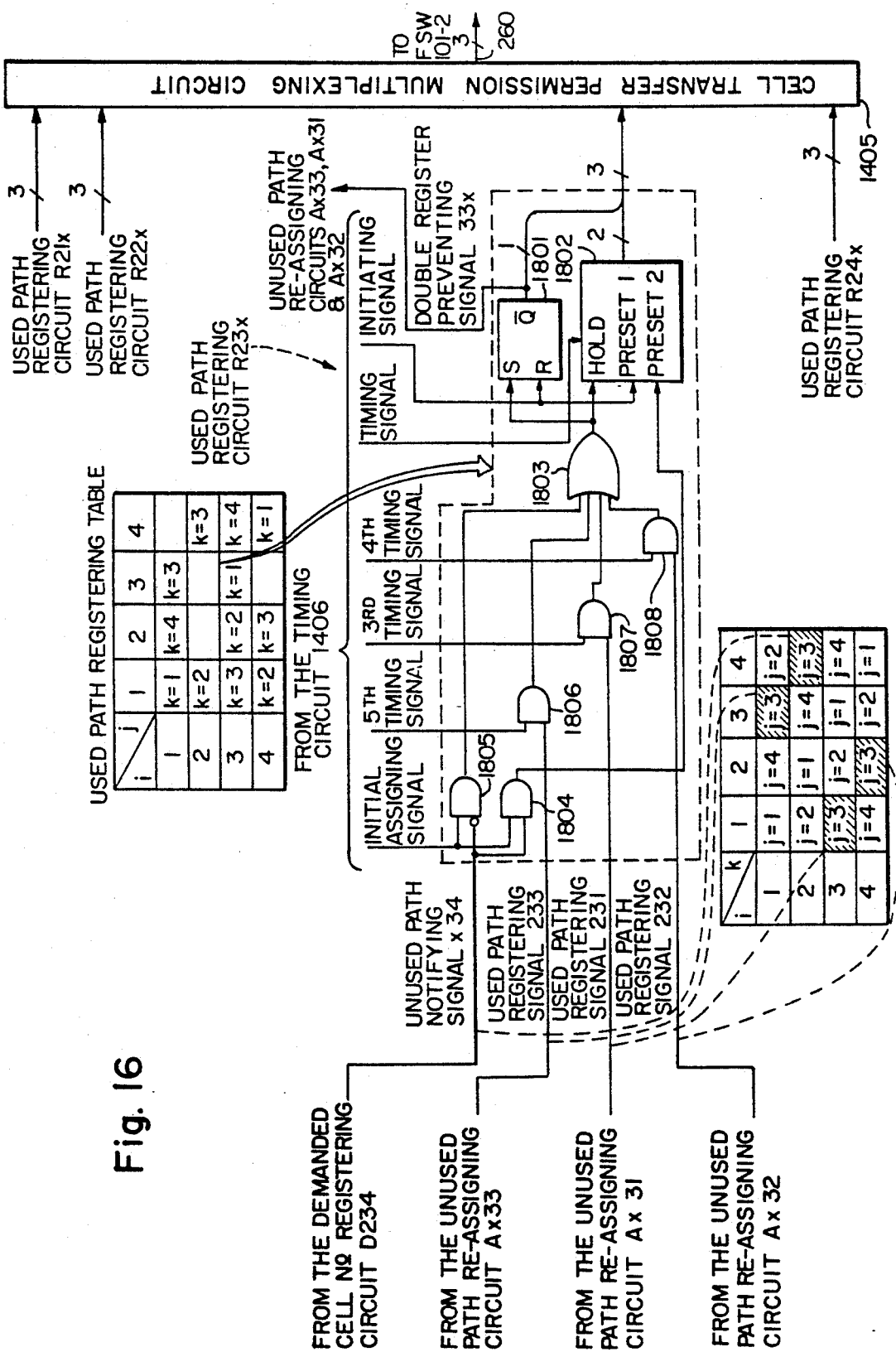
FIG. 16 is a circuit diagram of a used path registering circuit R.

As shown in FIG. 16, each used path registering circuit R comprises an RS.FF (reset/set flip-flop) 1801, a 4 counter 1802 which is a 2-bit counter, an OR circuit 1803, and five AND circuits 1804 through 1808.

Each circuit R corresponds to a portion of FIG. 11. In the unused path registering circuit R23x, for example, a data indicating whether the (i=2, j=3) path is available or not is retained in the RS.FF 1801. If such a path is not available, the destination (the value of k) of the cell which has been transferred through the (i=2, j=3) path is held in the 4 counter 1802.

Practically, an initiation signal is sent from the timing circuit 1406 to a reset terminal of the RS.FF 1801 and a preset terminal 1 of the 4 counter 1802. If the initiation signal gets "high" before the re-assignment, the RS.FF 1801 is reset and the value of k is preset.

It may be controlled so that the default path is used automatically by the F switch 101-i even if the cell transfer arbitration circuit gives no permission. In such a case, there is no need for presetting the default value of k.

The 4 counter 1802 receives from the AND circuit 1804 through a preset terminal 2 thereof a logical product of the unused path notifying signal x34 and an initial re-assigning signal. The signal x34 is sent from the demanded cell number registering circuit D234, and the initial re-assigning signal gets "high" if no default path is used at the start of the re-assignment. When the initial re-assigning signal gets "high", the value obtained by subtracting 1 from the default values of k of the paths from the F switch 101-1 is preset. For example, the circuits R11x, R21x, R31x and R41x all concern the S switch 102-1. The default path from the F switch 101-1 to the S switch 102-1 is destined to the T switch 103-1 (k=1). Since 1-1=0, 4 is preset. The circuit R12x, R22x, R32x and R42x all concern the S switch 102-2. The default path from the F switch 101-1 to the S switch 102-2 is destined to the T switch 103-4 (k=4). As a result, 3 (=4-1) is preset. Each preset value is incremented each time the timing signal gets "high" at the start of the re-assignment.

A set terminal of the RS.FF 1801 and a hold terminal of the 4 counter 1802 are both connected with the OR circuit 1803 which is connected with the AND circuits 1805 through 1808. When any of the AND circuits 1805 through 1808 gets "high", the RS.FF 1801 is set (namely, the double register preventing signal 23x gets "low") and also the value of the 4 counter 1802 is fixed.

The AND circuit 1805 receives a reversed signal of the unused path notifying signal x34 through one input terminal thereof and also receives an initial re-assigning signal through the other input terminal thereof.

If the (i=2, j=3) default path is used, the unused path notifying signal x34 is "low". That is why the signal x34 is reversed to be "high" in order that the (i=2, j=3) path is detected to be used when the initial re-assigning signal gets "high".

The AND circuits 1806 through 1808 respectively receive used path registering signals 233, 231 and 232 from the unused path re-assigning circuits Ax33, Ax31 and Ax32 through one input terminals thereof as well as receiving the timing signals through the other input terminals. The timing signal to the AND circuit 1806 gets "high" at the fifth re-assigning timing of FIG. 15 (same as the timing signal sent to the circuit Ax33). The timing signal to the AND circuit 1807 gets "high" at the third re-assigning timing of FIG. 15 (same as the timing signal sent to the circuit Ax31). The timing signal to the AND circuit 1808 gets "high" at the fourth re-assigning timing of FIG. 15 (same as the timing signal sent to the circuit Ax32). In other words, the (i=2, j=3) path is detected to be used when the used path registering signals 233, 231 and 232 get "high" at the above each re-assigning timing as well as when the initial re-assigning signal gets "high".

A practical operation of the used path registering circuit R23x will be explained below.

When the initiation signal from timing circuit 1406 gets "high" prior to the re-assignment, the RS.FF 1801 is reset and the 4 counter 1802 has the value 4 preset therein. The value 4 is the value of k of the (i=2, j=3, k=4) default path.

Then, the initial re-assigning signal gets "high" at the start of the re-assignment. If the (i=2, j=3, k=4) default path is used as the default, the reversed signal of the unused path notifying signal x34 is "high". Therefore, the AND circuit 1805 outputs "high". The default value 4 is fixed in the 4 counter 1802 and the double register preventing signal from the RS.FF 1801 gets "low". If the (i=2, j=3, k=4) path is not used as the default, the unused path notifying signal x34 is "high". Therefore, the AND circuit 1804 outputs "high", and the value 4 is preset in the 4 counter 1802.

After that, the value of the 4 counter 1802 is incremented at each re-assigning timing whereas the used path registering signals 231, 232 and 233 are detected at the third, fourth and fifth re-assigning timing. At the fourth timing, the signal 232 gets "high" and so the double register preventing signal from the RS.FF 1801 gets "low". The value 2 (2+4-6; since 6>4, 6-4=2), which is held in the 4 counter, is fixed. This means k=2 is registered in the (i=2, j=3) block of FIG. 11.

The re-assignment of the (i=2, j=3) path is prohibited at the re-assigning timing thereafter in this way. When the re-assignment operation is completed, the output of the RS.FF 1801 and the value held in the 4 counter 1802 (namely, the cell transfer permitting signal which indicates that the cell which is sent from F switch 101-2 to the S switch 102-3 should be destined to the T switch 103-3) are outputted from the cell transfer permission multiplexing circuit 1405 to the F switch 101-2 through the line 260.

Figure 17:
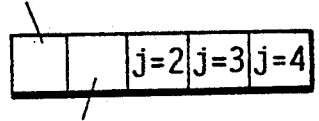
FIG. 17 shows a format of a cell transfer permitting signal sent from the cell transfer arbitration circuit 104 to the F switch 101-i.

The above cell transfer permitting signal, as shown in FIG. 17, comprises a frame synchronizing pattern and signals which indicate, for each value of j, whether the cell transfer is permitted or not and the destination of the cell. The pattern and the signals are time-division-multiplexed before being outputted to the F switch 101-2.

According to this embodiment, the paths which were not assigned as the default are re-assigned for each cell transferring time. The consequence is an extremely high efficiency of cell transfer.

EMBODIMENT II

A second embodiment of this invention concerns a growable interconnect fabric cell switch module equipped with an additional set of F switches and S switches as a sub path network as well as the construction of the first embodiment. The identical elements with those of the first embodiment bear the identical numbers and will not be explained.

Why the Sub Path Network Improves the Delay-Throughput

In the first embodiment, one cell transferring demand remains unsatisfied for each of the (i=1, k=1) and (i=2, k=2) paths after the re-assignment is completed. Although the (i=1, j=4, k=2) and (i=2, j=2, k=1) paths are still unused, the improvement of the delay-throughput is limited.

The provision of the additional set of F switches 101-i' and S switches 102-j' (FIG. 18) realizes the simultaneous transfer of all the cells by the usage of the (i'=1', j'=2') and (i'=2', j'=4') paths. In other words, the unused paths between S switches 102-j and the T switches 103-k are fully utilized.

Figure 18:
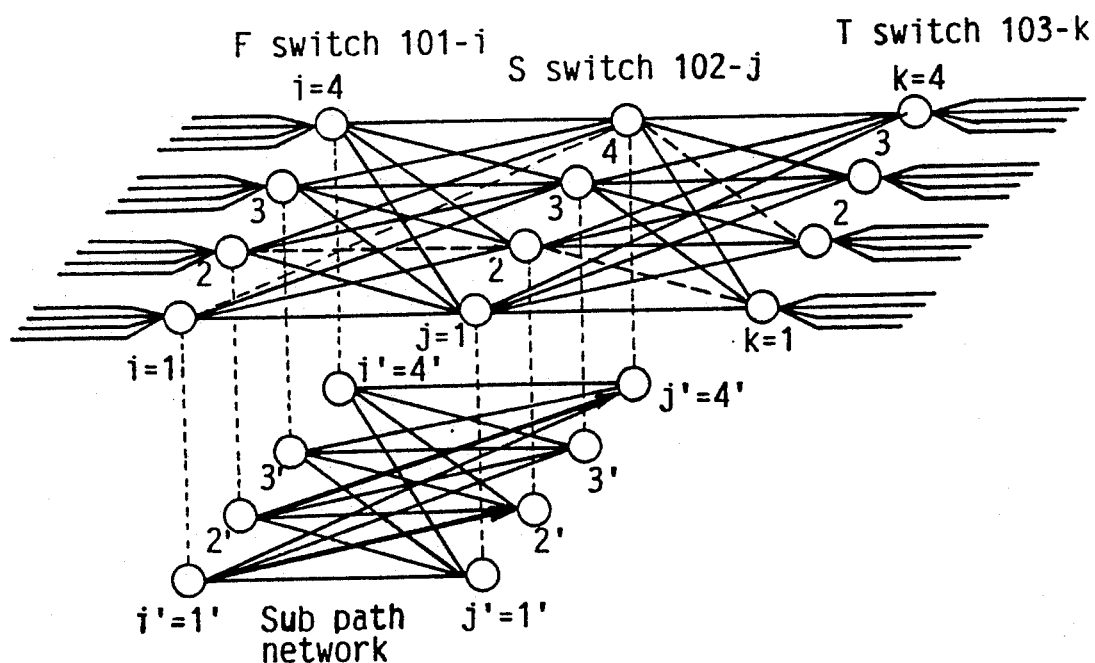
FIG. 18 is a schematic view of a growable interconnect fabric cell switch module of a second embodiment.

Each T switch 103-k only processes four cells at the maximum during one cell transferring time. It is preferable to provide the sub path network between the F switches 101-i and the S switches 102-j as shown in FIG. 18 than between the S switches 102-j and the T switches 103-k.

Arbitration Algorithm

FIGS. 19 through 22 show an algorithm for assigning the unused paths by use of the sub path network after the re-assignment of the first embodiment. The assignment of the first embodiment will be referred to as the main re-assignment and the assignment of the second embodiment as the sub assignment, hereinafter.

The demanded cell number registering table (FIG. 8) becomes as shown in FIG. 19 after the main re-assignment. The numerals of the (i=2, k=2) and the (i=4, k=4) blocks of FIG. 19 are each smaller than those of FIG. 8 by 1. The re-assignment demanding table (FIG. 9) becomes as shown in FIG. 20 after the main re-assignment, which is used as a sub assignment demanding table. FIGS. 21 and 22 are prepared as an unused path supervising table and a used path registering table, respectively. FIG. 22 shows that no sub paths is used since no path is assigned as the default.

The sub assignment algorithm will be explained with an example.

(1) An unused path between the S switches 102-j and the T switches 103-k is retrieved from FIG. 21 (for example, the (j=2, k=1) path).

(2) Among the cells which demand the sub assignment of the unused paths of FIG. 20, the one having the T switch retrieved in (1) as the destination is retrieved, and the source of such a cell is obtained. In this case, the source is the F switch 101-1.

(3) Whether the (i'=1', j'=2') path is available as the sub path substituting the (i=1, j=2) path or not is judged from FIG. 22.

(4) If such a path is available, the sub assignment is possible.

4-1) 1 is subtracted from the number in the block corresponding to the above available path of FIG. 20. The (i=1, k=1) block of FIG. 20 becomes "0".

4-2) The mark "*" of the corresponding block of FIG. 21 is deleted. (i=2, k=1)

4-3) The destination of the above available path (k=1) is registered in the corresponding block (i'=1', j'=2') of FIG. 22.

4-4) Execute 1) through 4-3) for all the unused paths. As a result, the (i=2, k=2) block of FIG. 19 becomes "0", and the T switch 103-2 is registered in the (i'=2', j'=4') block of FIG. 22.

(5) If the path is not available in (3), the operation of (1) and thereafter is repeated for all the other unused paths until an available path is found.

The (i'=1', j'=2', k=1) and (i'=2', j'=4' k=2) paths are assigned, whereby all the cells are transferred.

Practical Construction

Figure 23:
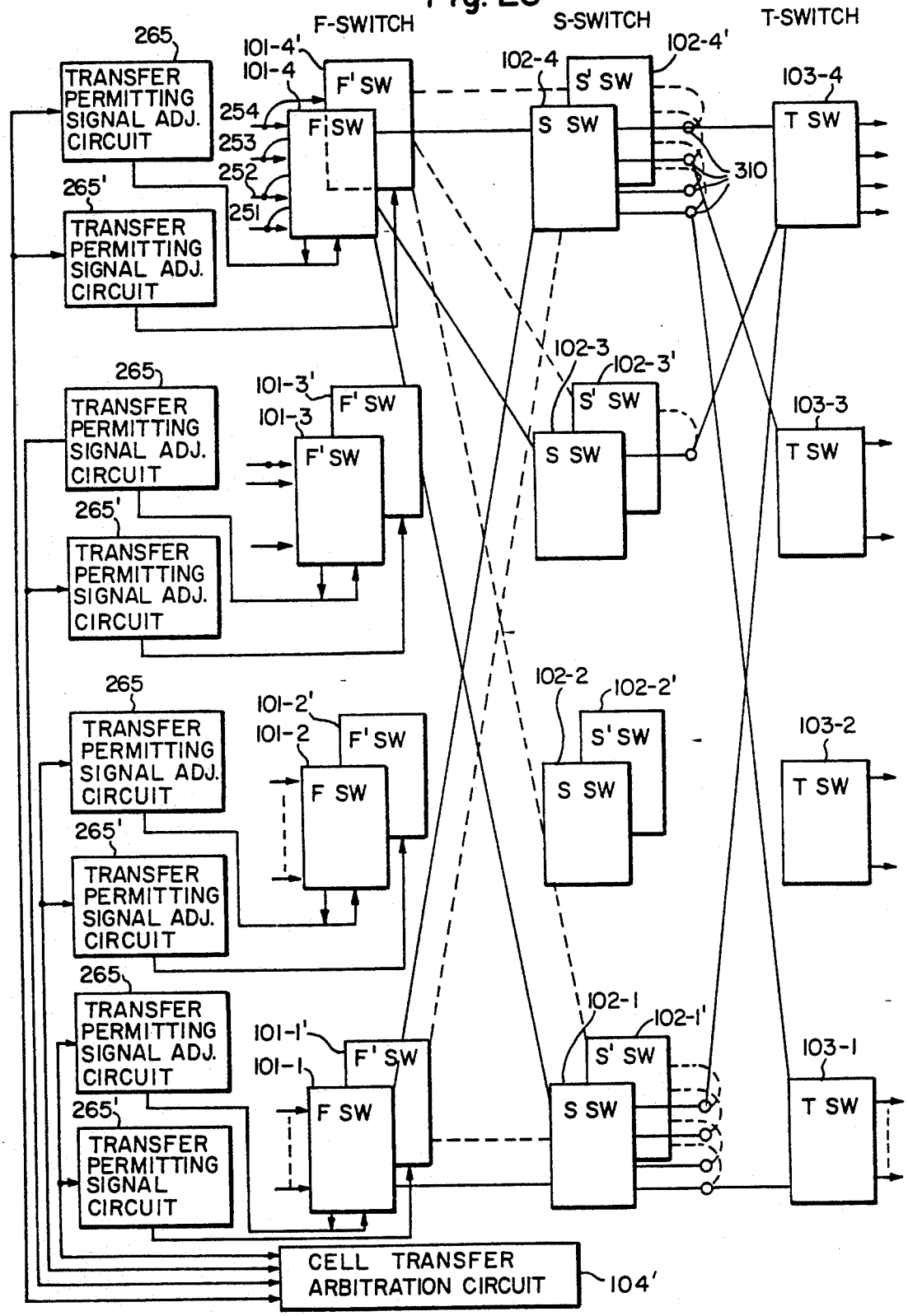
FIG. 23 is a circuit diagram of the growable interconnect fabric cell switch module of the second embodiment.

FIG. 23 shows an overall construction of the growable interconnect fabric cell switch module of the second embodiment. The switch module is equipped with transfer permitting signal adjusting circuits 265 and 265' in addition to the F switches 101-i and 101-i', the S switches 102-j and 102-j' and the T switches 103-k. A cell transfer arbitration circuit 104' is provided instead of the cell transfer arbitration circuit 104.

Input lines 251 through 254 are each branched, whereby each of the lines are connected to the F switches 101-i and 101-i'. Paring outputs from the S switches 102-j and 102-j' are combined by OR circuits 310, respectively. For example, the output which is originated in the input line 254 and comes out of the S switch 102-4' and the output which is originated in the input line 254 and comes out of the S switch 102-4 are combined.

Owing to the transfer permitting signal adjusting circuits 265 and 265', the cells which are to be sent to the S switches 102-j are sent to F switches 101-i, and the cells which are to be sent to the S switches 102-j' are sent to the F switches 101-i'. Such a control is practically done as follows.

Figure 24:
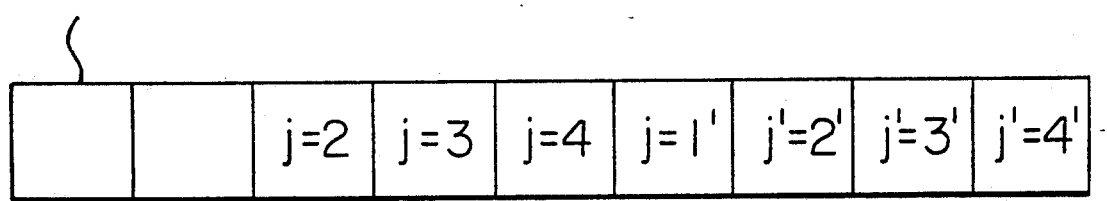
FIG. 24 shows a format of a cell transfer permitting signal sent from the cell transfer arbitration circuit 104' to the F switch 101-i.

As shown in FIG. 24, the cell transfer arbitration circuit 104' outputs a cell transfer permitting signal which is obtained by time-division-multiplexing a frame synchronizing pattern and signals which indicate, for each S switch (both 102-j and 102-j'), whether the cell transfer is permitted or not and the destination of the cell.

The circuit 265 outputs cell transfer permitting signal for the S switch 102-j to the corresponding F switch 101-i as it is. The cell transfer permitting signal for the S switch 102-j' is, before being outputted, converted into a signal which makes the register 210 only read the cell. In other words, the cell transfer permitting signals for the S switches 102-j' are only sent from the queue buffers 201 through 204 into the register 210 in the F switch 101-i, but no such signals are sent to the output circuits 221 through 224 of the F switch 101-1.

The circuit 265' works so that the cell transfer permitting signals for the S switches 102-j are only sent from the queue buffers 201 through 204 to the register 210 in the F switch 101-i'. As a result, no such signals are sent to the output circuits 221 through 224 of the F switch 101-1'.

Instead of providing two sets of F switches, only one set of F switches 101-i equipped with two groups of the output circuits 221 through 224 may be provided. However, the provision of two sets of F switches is more advantageous in that a same type of switches can be employed for all the F, S and T switches including the additional ones.

Figure 25:
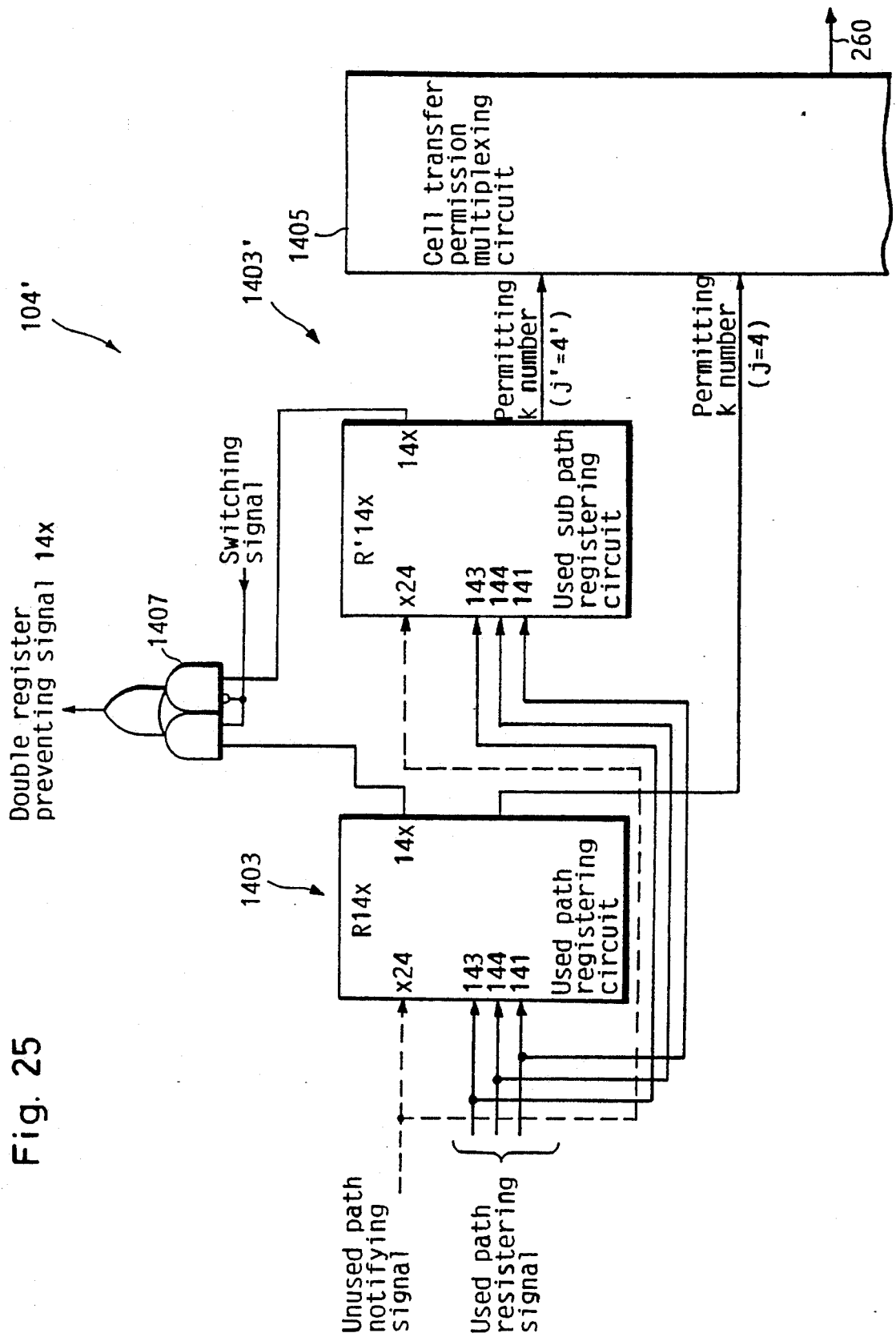
FIG. 25 is a circuit diagram of the cell transfer arbitration circuit 104'.

As shown in FIG. 25, the cell transfer arbitration circuit 104' comprises a used path sub registering circuit group 1403' having 16 used path sub registering circuits R' in addition to the construction of the circuit 104. The circuit 104' further comprises a switching circuit 1407 for selecting the used path sub registering circuit R' or the used path registering circuit R. FIG. 25 shows the circuits R14x and R'14x.

Each unused path sub registering circuit R' corresponds to a portion of the used path registering table (FIG. 22).

When a switching signal from the timing circuit 1406 is "high", the switching circuit 1407 selects the used path registering circuit R so as to effect the initial assignment and main re-assignment as in the first embodiment. When the switching signal gets "low", the circuit 1407 selects the used path sub registering circuit R' to effect the sub assignment.

A detailed explanation of the sub assignment operation will be omitted because the operation is substantially the same as the main re-assignment except that the initial assignment is not done and that the circuits R' are used instead of the circuits R.

After the sub assignment is completed, the cell transfer arbitration circuit 104' executes the time division multiplex as shown in FIG. 24 and thus outputs the cell transfer permitting signal.

Even if the sub path network is employed, it never occurs that two or more cells are sent to one identical T switch 103-k through the corresponding S switches 102-j and 102-j' (for example, S switches 102-1 and 102-1'). Accordingly, the orderly cell transfer is certified by setting priority levels of cell transfer as in the first embodiment. For example, the cell transferred through the S switch 102-2' gets a higher priority than the cell transferred through the S switch 102-3.

EMBODIMENT III

A third embodiment of this invention is distinct from the first and the second embodiments in the construction and functions of the cell transfer demanding circuit.

Figure 26:
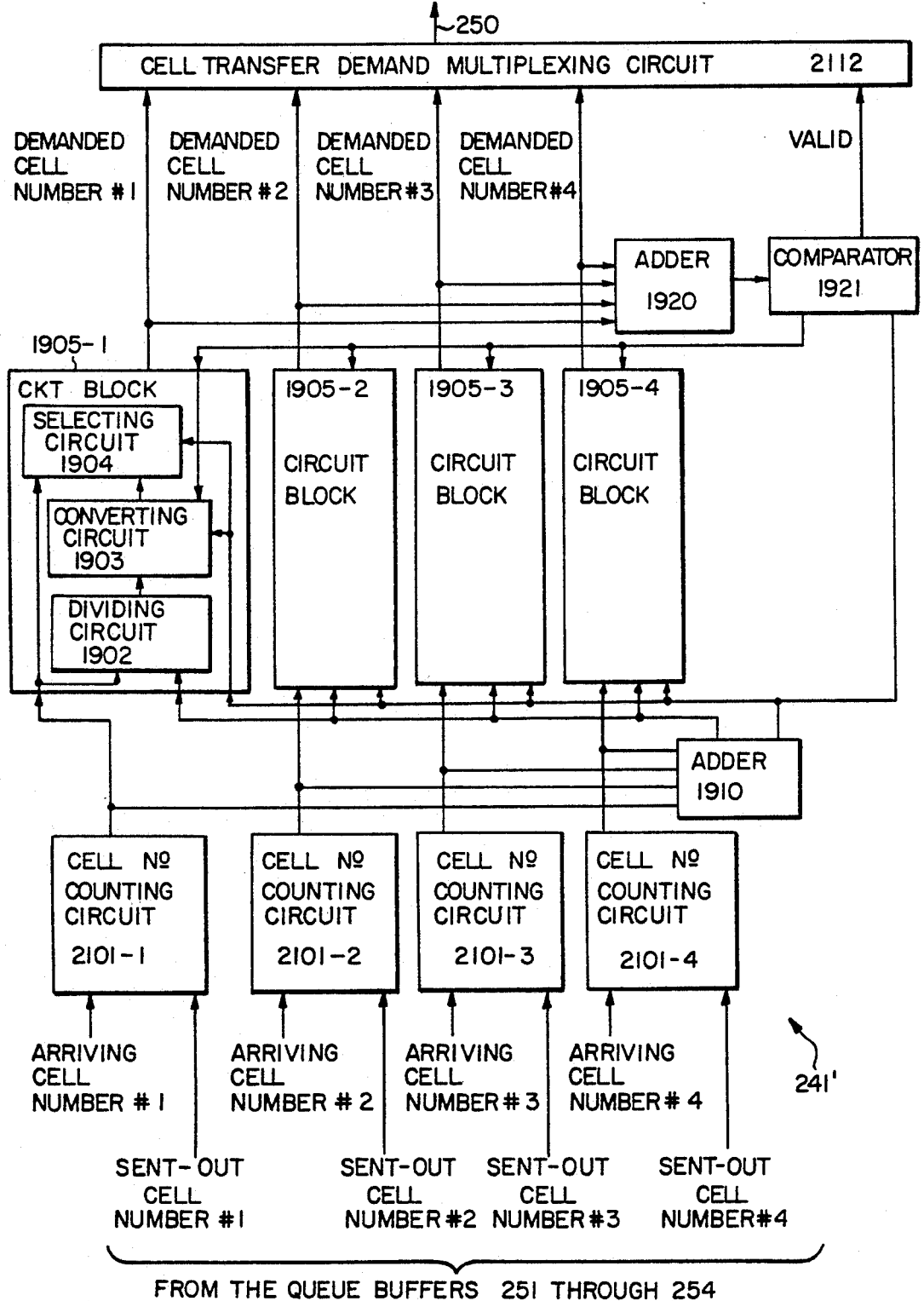
FIG. 26 is a circuit diagram of a cell transfer demanding circuit 241' of a third embodiment.

FIG. 26 is a block diagram of a cell transfer demanding circuit 241', which is constructed and functions as follows.

The cell number counting circuits 2101-1 through 2101-4 count and retain the accumulated cell numbers #1 through #4 of the queue buffers 201 through 204 in the same way as those mentioned in the first embodiment.

An adder 1910 obtains a sum of the accumulated cell numbers #1 through #4. If the above sum is less than 4, the circuit 1910 sends out a less-than-4 signal. Circuit blocks 1905-1 through 1905-4 each comprise a dividing circuit 1902, a converting circuit 1903 and a selecting circuit 1904. The following explanation will be done with the circuit block 1905-1 as an example.

The dividing circuit 1902 divides the accumulated cell number #1 sent from the cell counting circuit 2101-1 by the sum sent from the adder 1910.

Figures 27, 28:
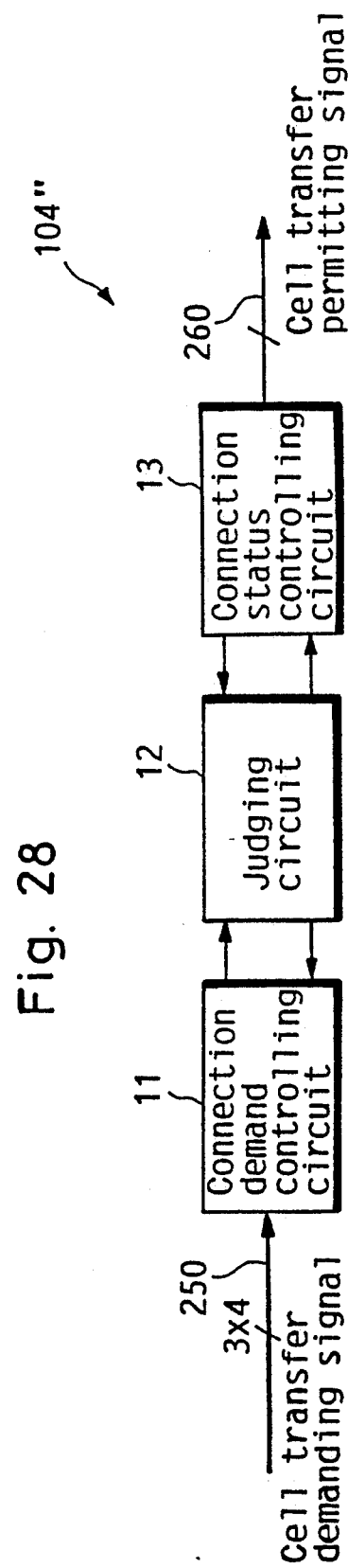
FIG. 27 is a conversion table used by a converting circuit 1903 of the cell transfer demanding circuit 241'.
FIG. 28 is a partial block diagram of a fourth embodiment.

The converting circuit 1903 converts the division result sent from the circuit 1902 in accordance with a conversion table shown in FIG. 27. When receiving an adding signal or a subtracting signal from a comparator 1921, the circuit 1903 increases or decreases the conversion result by 1. The minimum conversion result of the circuit 1903 is 0.

The selecting circuit 1904 selects whichever the smaller among the value from the accumulated cell number #1 from the circuit 2101-1 and the conversion result from the circuit 1903. If the circuit 1904 receives the less-than-4 signal from the adder 1910, the accumulated cell number #1 is selected.

Another adder 1920 obtains a sum of all the selection results from the circuits 1904 of the circuit blocks 1905-1 through 1905-4.

The comparator 1921 compares the sum from the circuit 1920 and 4. If the sum is larger than 4, the comparator 1921 sends a subtracting signal to the circuit blocks in the number corresponding to the difference between the sum and 4. If the sum is less than 4, on the contrary, the comparator 1921 sends an adding signal to the circuit blocks in the number of the difference. The circuit blocks to which the adding or the subtracting signal is to be sent are selected randomly or in an order, whereby preventing the same blocks from always receiving the signal. If the less-than-4 signal is sent from the adder 1910, no adding or subtracting signal is outputted. If the sum from the adder 1920 is exactly 4 or if the less-than-4 signal is outputted from the adder 1910, the comparator 1921 sends out a valid signal which indicates all the demanded cell numbers #1 through #4 sent from the circuit blocks 1905-1 through 1905-4 are valid.

Owing to the above construction and functions, the following operation is carried out. The circuit blocks 1905-1 through 1905-4 output the selection results of the circuits 1904. The sum of the selection results are approximately 4, and the selection results are in almost the same ratio as the accumulated cell numbers #1 through #4. When the sum of the selection results becomes exactly 4 by the adding or the subtracting signal, the comparator 1921 outputs a valid signal and the cell transfer demand multiplexing circuit 2112 sends a cell transfer demanding signal to the cell transfer arbitration circuit 104. If the less-than-4 signal is outputted, the accumulated cell numbers #1 through #4 are outputted as they are as the demanded cell numbers #1 through #4.

The adding or the subtracting signal may be sent to all the circuit blocks 1905-1 through 1905-4, simultaneously, not selectively. In accordance with the signal, each converting circuit 1903 decreases or increases the threshold values of FIG. 27. This also makes the sum of the demanded cell numbers #1 through #4 equal exactly 4.

EMBODIMENT IV

A modification of the cell transfer arbitration circuit 104 will be described as a fourth embodiment.

FIG. 28 is a block diagram of a cell transfer arbitration circuit 104''. A connection demand controlling circuit 11 stores the data of the demanded cell number registering table (FIG. 8) mentioned in the first embodiment in response to the cell transfer demanding signal sent from the F switch 101-i.

A connecting status controlling circuit 13 stores the data of the used path registering table (FIG. 11) also mentioned in the first embodiment.

A judging circuit 12 determines the cell transfer path based on the data stored in the circuits 11 and 12 as well as updating the data thereof. The circuit 12 is practically operated as follows by use of hardware.

Figure 29:
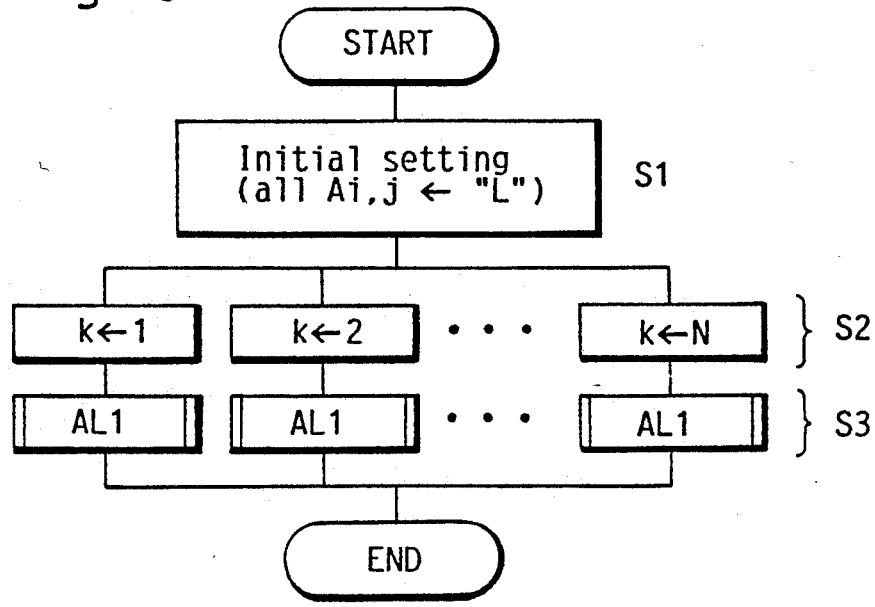
FIGS. 29 and 30 are flowcharts showing the operation of a judging circuit 12.

The symbols in FIGS. 29 and 30 and hereinafter have the following meanings.

$L_{i,k}$: a demanded cell number from the i'th F switch to the k'th T switch (stored in the circuit 11)

$A_{i,k}$: whether the path between the i'th F switch and the j'th S switch is used or not (stored in the circuit 13)

"L": unused

"H": used

Prior the cell transfer path arbitration, all $A_{i,j}$ are set to "L" (S1).

In S2 and S3, the operation is done in parallel.

When the demanded cell number from the F switches 101-1 through 101-N to the T switch 103-1 is sent out, k is set to 1 (S2) and an assignment operation AL1 is executed (S3).

When the demanded cell number to the T switch 103-2 2 is sent out, k is set to 2 (S2) and the same assignment operation AL1 is executed (S3) along with the above assignment operation AL1.

The assignment operations AL1 are executed in the same manner until the demanded cell number to the T switch 103-N is completely handled.

Figure 30:
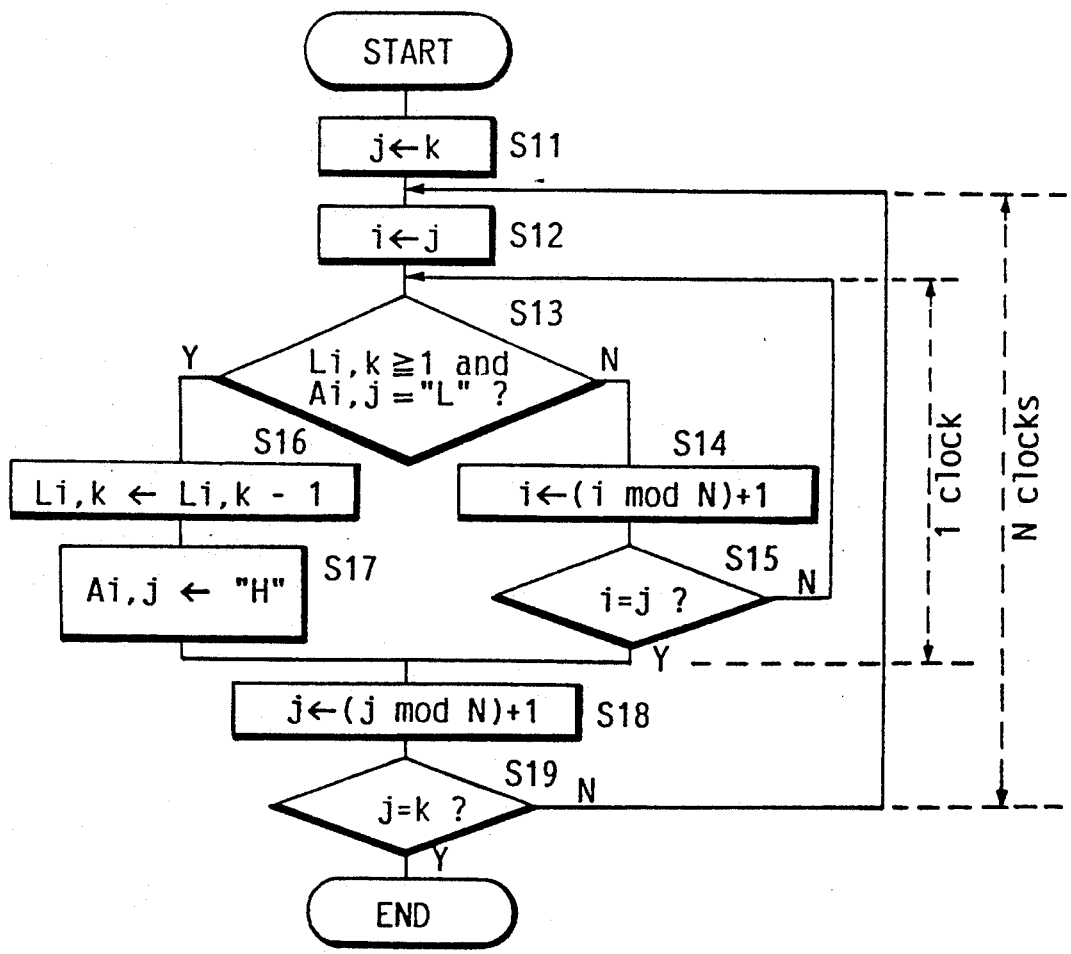

The assignment operation AL1 is carried out as shown in FIG. 30.

In S11, j is set to k. Namely, the paths from the S switches 102-j to the T switches 103-k are set in repetition from j=k to j=k+N−1 (if j>N, k+N−1−N).

In S12, i is set to j, whereby the F switch to be connected to the j'th S switch is selected as follows.

In S13, whether $L_{i,k} \geq 1$ and also $A_{i,j} =$ "L" or not is judged. If not, i is incremented (S14 and S15) until i=j. If so in S13, the path from the i'th F switch to the k'th T switch through the j'th S switch can be assigned. Therefore, 1 is subtracted from $L_{i,k}$ (S16) and $A_{i,j}$ is set to "H" (S17).

j is incremented (S18) and the operation of S12 and thereafter is repeated until j=k (S19).

If the operation from S13 to S15 or from S13 to S17 is executed in 1 clock, each assignment operation AL1 is done in N clocks. Since the assignment operations for k=1, 2, ... N are done in parallel with a delay of 1 clock for each, the whole assignment can be done in 2N-1 clocks.

Although a 16×16 interconnect fabric cell switch module comprising twelve 4×4 switches is described in the above embodiments, this invention is applicable to other types of switch modules. If this invention is applied to a 1024×1024 cell switch module comprising 32×32 switches, the cell transfer arbitration circuit arbitrates 32 F switches (1024/32). If the arbitration is done for the T switches 103-k serially as shown in FIG. 15, the arbitration ought to be done 63 times (32x2-1) for T switches 103-k per cycle of cell transfer. If, for example, a 64 octet cell is transferred at a speed of 180.8 M bit/sec., the number of the cells which can be sent per second is $180.8 \times 10^6/(8 \times 64) = 0.353 \times 10^6$. This means the arbitration for T switches 103-k ought to be done only $63 \times 0.353 \times 10^6 = 22.2 \times 10^6$ times. Accordingly basic clock of 22.2 MHz can be used. In such a case, the circuits may be formed of CMOS elements, which are advantageous in terms of manufacturing costs and integration level of the LSI.

Although the present invention has been fully described by way of embodiments with references to the accompanying drawings, it is to be noted that various changes and modifications will be apparent to those skilled in the art. Therefore, unless such changes and modifications depart from the scope of the present invention, they should be construed as being included therein.

We claim:

1. A growable interconnect fabric cell switch module for receiving data in cell configuration and outputting cells of data, comprising:
a plurality of first cell switches for interconnecting the cells by receiving the cells into the switch module;
a plurality of second cell switches for receiving the cells outputted from the first cell switches;
a plurality of third cell switches for receiving the cells outputted from the second cell switches;
wherein the plurality of first cell switches is further comprised of a demanded cell number generating means for generating a plurality of demanded cell number signals indicative of a number of cells to be transferred from each first cell switch to each third cell switch; and
path arbitrating means for receiving the demanded cell number signals to generate a cell transfer permitting signal applied to the plurality of first cell switches, thereby making a decision on which second cell switch ought to be used in transferring the cells received by the plurality of first cell switches.

2. The growable interconnect fabric cell switch module of claim 1, wherein said path arbitrating means comprises:
demanded cell number retaining means for retaining the demanded cell number signals;
transfer path detecting means for detecting an unused path between the second cell switches and the third cell switches based on the demanded cell number signals retained by the demanded cell number retaining means;
data retaining means for retaining a data which indicates an assignment status of a path between the first cell switches and the second cell switches;
path assignment demanding means for demanding an assignment of a path between at least one of the first cell switches and the third cell switches;
path assigning means for assigning a path between the first cell switches and the second cell switches and a path between the second cell switches and the third cell switches based on the detection result of the transfer path detecting means, the data retained by the data retaining means and the demand of the path assignment demanding means; and
path data registering means for registering a data indicating the assigned path between the first cell switches and the second cell switches in the data retaining means.

3. The growable interconnect fabric cell switch module of claim 2, wherein the path assigning means assign the paths between the first cell switches and the second cell switches and the paths between the second cell switches and the third cell switches in a plurality of combinations in accordance with a specified priority order as well as changing the priority order for each transfer cycle.

4. The growable interconnect fabric cell switch module of claim 2, further comprising:
a plurality of fourth cell switches and a plurality of fifth cell switches for providing a bypass around the first cell switches and the second cell switches; and
adjusting means for directing cells to the plurality of first cell switches when such cells are to be switched through the plurality of second cell switches and for directing cells to the plurality of fourth cell switches when such cells are to be switched through the plurality of fifth cell switches; and
wherein the path arbitrating means is further comprised of a bypass arbitrating means for receiving the demanded cell number signals to generate a bypass cell transfer permitting signal applied to the plurality of fourth cell switches, thereby making a decision on which fifth cell switch ought to be used in transferring the cells received by the plurality of fourth cell switches.

5. The growable interconnect fabric cell switch module of claim 4, the bypass arbitrating means comprising:
bypass demanded cell number retaining means for retaining the bypass demanded cell number signals;
additional transfer path detecting means for detecting an unused path between the fifth cell switches and the third cell switches based on the bypass demanded cell number signals retained by the bypass demanded cell number retaining means;

additional data retaining means for retaining a data which indicates an assignment status of a path between the fourth cell switches and the fifth cell switches;

additional path assignment demanding means for demanding an assignment of a path between at least one of the first cell switches and the third cell switches;

additional path assigning means for assigning a path between the fourth cell switches and the fifth cell switches and a path between the fifth cell switches and the third cell switches based on the detection result of the additional transfer path detecting means, the retained by the additional data retaining means and the demand of the additional path assignment demanding means; and additional path data registering means for registering a data indicating the assigned path between the fourth cell switches and the fifth cell switches in the additional data retaining means.

6. A growable interconnect fabric cell switch module for receiving data in cell configuration and outputting cells of data, comprising:

a plurality of first cell switches for interconnecting the cells by receiving the cells into the switch module;

a plurality of second cell switches for receiving the cells outputted from the first cell switches;

a plurality of third cell switches for receiving the cells outputted from the second cell switches;

wherein the plurality of first cell switches is further comprised of a demanded cell number generating means for generating a plurality of demanded cell number signals indicative of a number of cells to be transferred from each first cell switch to each third cell switch;

a plurality of fourth cell switches and a plurality of fifth cell switches for providing a bypass around the first cell switches and the second cell switches;

adjusting means for directing cells to the plurality of first cell switches when such cells are to be switched through the plurality of second cell switches and for directing cells to the plurality of fourth cell switches when such cells are to be switched through the plurality of fifth cell switches; and path arbitrating means for receiving the demanded cell number signals to generate a cell transfer permitting signal applied to the plurality of first cell switches, thereby making a decision on which second cell switch ought to be used in transferring the cells received by the plurality of first cell switches; and wherein the path arbitrating means is further comprised of a bypass arbitrating means for receiving the demanded cell number signals to generate a bypass cell transfer permitting signal applied to the plurality of fourth cell switches, thereby making a decision on which fifth cell switch ought to be used in transferring the cells received by the plurality of fourth cell switches.

7. The growable interconnect fabric cell switch module of claim 6, wherein the path arbitrating means assigns the paths between the cell switches in a plurality of combinations in accordance with a specified priority order and changes the priority order for each transfer cycle.

8. The growable interconnect fabric cell switch module of either one of claims 1 and 6, wherein each first cell switch comprises:

queue buffers corresponding to the third cell switches, respectively; and demanded cell number obtaining means for obtaining the demanded cell number signals;

wherein the demanded cell number signals are in substantially the same ratio as numbers of the cells stored in the queue buffers, and wherein a sum of the demanded cell number signals is, at the maximum, equal to a transferrable cell number, which indicates a number of the cells which can be transferred from the first cell switch to the second cell switches.

9. The growable interconnect fabric cell switch module of claim 8, wherein each first cell switch further comprises:

cell transfer controlling means for writing a plurality of cells inputted to the first cell switch into the queues buffers in accordance with priority levels of the cells as well as simultaneously reading out a plurality of cells from the cell queues buffers and sending the cells to the second switches, the second cell switches and the cells sent to the second cell switches having corresponding priority levels; and cell output controlling means for, when the cells sent from the second cell switches simultaneously are received by one of the third cell switches, controlling the above one third cell switch to output the received cells in an order based on the priority levels of the second cell switches.

10. The growable interconnect fabric cell switch module of claim 8, wherein the demanded cell number obtaining means comprises:

counting means for counting the number of the cells stored in each queue buffer;

shifting means for bit-shifting each counting result of the counting means;

subtracting means for subtracting a specified value from each bit-shift result obtained by the shifting means;

adding means for adding all the subtraction results obtained by the subtracting means;

comparing means for comparing the addition result obtained by the adding means and the transferrable cell number; and demanded cell number adjusting means for controlling the shifting means to shift each counting result to the left by 1 more bit when the addition result is smaller than the transferrable cell number, for controlling the subtracting means to selectively subtract the specified value from the bit-shift results until the addition result equals the transferrable cell number when the addition result is larger than the transferrable cell number, for outputting each subtraction result as a demanded cell number when the addition result equals the transferrable cell number, and for outputting each counting result as the demanded cell number when the addition result is still smaller than the transferrable cell number ever after the shifting means shifts each counting result to the left by 1 more bit.

11. The growable interconnect fabric cell switch module of claim 8, wherein the demanded cell number obtaining means comprises:

counting means for counting the number of the cells stored in each queue buffer;

adding means for adding all the counting results obtained by the counting means;

dividing means for dividing each counting result by the addition result obtained by the adding means;

converting means for converting the division results obtained by the dividing means into integers which are substantially in the same ratio as the division results and the sum of said integers equals the transferrable cell number;

comparing means for comparing the addition result obtained by the adding means and the transferrable cell number; and demanded cell number controlling means for outputting each counting result as a demanded cell number when the addition result is no more than the transferrable cell number and for outputting each conversion result obtained by the converting means as the demanded cell number when the addition result is larger than the transferrable cell number.

12. A growable interconnect fabric cell switch module for receiving data in cell configuration and outputting cells of data, comprising:

a plurality of first cell switches for interconnecting the cells by receiving the cells into the switch module;

a plurality of second cell switches for receiving the cells outputted from the first cell switches;

a plurality of third cell switches for receiving the cells outputted from the second cell switches;

wherein the plurality of first cell switches is further comprised of a demanded cell number generating means for generating a plurality of demanded cell number signals indicative of a number of cells to be transferred from each first cell switch to each third cell switch;

transfer demand controlling means for storing the demanded cell number signal;

transfer status generating means for generating a first transfer status signal indicative of the availability of a particular path between the first cell switches and second cell switches and a second transfer status signal indicative of the availability of a particular path between the second cell switches and the third cell switches;

transfer status storing means for storing the above-mentioned transfer status signals; and unused path assigning means for retrieving unused paths between the second cell switches and the third cell switches and simultaneously assigning a plurality of paths between the first cell switches and the third cell switches, wherein the above paths between the first cell switches and the third cell switches each include one of the paths retrieved by said unused path assigning means and also include an unused path between the first cell switches and the second cell switches.

13. A growable interconnect fabric cell switch module for receiving data in cell configuration and outputting cells of data, comprising:

a plurality of first cell switches for interconnecting the cells by receiving the cells into the switch module;

a plurality of second cell switches for receiving the cells outputted from the first cell switches;

a plurality of third cell switches for receiving the cells outputted from the second cell switches;

demanded cell number determining means for determining a demanded cell number, which is a number of the cells which demand to be transferred from each first cell switch to each third cell switch;

path assigning means for assigning a path based on an assignment status of a path between the first cell switches and the second cell switches, an assignment status of a path between the second cell switches and the third cell switches, and a difference between the demanded cell number and a number of paths which are already assigned; and cell transfer controlling means for transferring the cell through the assigned path.

14. The growable interconnect fabric cell switch module of claim 13, further comprising:

a plurality of fourth cell switches for receiving the cells through an input line which also provides cells to the plurality of first cell switches; and a plurality of fifth cell switches for sending the cells sent from the fourth cell switches to an input line of each third cell switch which also receives cells from the plurality of second cell switches.

15. The growable interconnect fabric cell switch module of claim 13, wherein the path assigning means serially assigns one of a plurality of combinations of paths between the plurality of first cell switches and the plurality of third cell switches in accordance with a priority order.

16. The growable interconnect fabric cell switch module of claim 15, wherein the above priority order is predetermined based on at least one of a numerical order of the third cell switches, a numerical order of the paths between the second cell switches and the third cell switches, a numerical order of the paths between the first cell switches and the second cell switches and whether the paths are default or not.

17. The growable interconnect fabric cell switch module of claim 15, wherein the above priority order is changed for each transfer cycle.

18. The growable interconnect fabric cell switch module of claim 15, wherein the priority order is realized by assigning a path having a higher priority earlier than a path having a lower priority.

19. The growable interconnect fabric cell switch module of claim 15, wherein the priority order is realized by prohibiting an assignment of a path having a lower priority while a path having a higher priority is assigned.

20. A growable interconnect fabric cell switch module for receiving data in cell configuration and outputting cells of data, comprising:

a plurality of first cell switches for interconnecting the cells by receiving the cells into the switch module;

a plurality of second cell switches for receiving the cells outputted from the first cell switches;

a plurality of third cell switches for receiving the cells outputted from the second cell switches;

demanded cell number determining means for determining a demanded cell number, which is a number of the cells which demand to be transferred from each first cell switch to each third cell switch;

transfer demand means for generating a permission status signal indicative of the availability of a particular path between the second cell switches and the third cell switches and an assignment status signal indicative of the availability of a particular path between the first cell switches and the second cell switches;

path assigning means for assigning a non-default path between the first cell switches and the second cell switches based on the permission status signal and the assignment status signal; and cell transfer controlling means for transferring the cell through the assigned path.

21. The growable interconnect fabric cell switch module of claim 20, wherein the path assigning means assigns simultaneously a plurality of paths which lead to the different third cell switches and also have different paths between the first cell switches and the second cell switches.

22. The growable interconnect fabric cell switch module of claim 20, wherein the path assigning means notifies which third cell switch is to receive the cell to be sent to each second cell switch to the cell transfer controlling means.

23. A method for arbitrating cell transfer paths in a growable interconnect fabric cell switch module for receiving data in cell configuration and outputting cells of data, including a plurality of first cell switches for interconnecting the cells by receiving the cells into the switch module, a plurality of second cell switches for receiving the cells outputted from the first cell switches, and a plurality of third cell switches for receiving the cells outputted from the second cell switches, the method comprising the steps of:

generating a demanded cell number indicating a number of cells which demand to be transferred from each first cell switch to each third cell switch;

detecting an unused path between the second cell switches and the third cell switches based on the demanded cell number;

retaining a data in a data retaining means, wherein said data indicates an assignment status of a path between the first cell switches and the second cell switches;

demanding an assignment of a path between at least one of the first cell switches and the third cell switches;

assigning a path between the first cell switches and the second cell switches and a path between the second cell switches and the third cell switches based on the detected unused path, the data on the assignment status, and the demand for the assignment; and registering a data indicating the assigned path between the first cell switches and the second cell switches in the data retaining means.

24. A method for arbitrating cell transfer paths in a growable interconnect fabric cell switch module for receiving data in cell configuration and outputting cells of data, including a plurality of first cell switches for interconnecting cells by receiving the cells into the switch module, a plurality of second cell switches for receiving the cells outputted from the first cell switches, and a plurality of third cell switches for receiving the cells outputted from the second cell switches, the method comprising the steps of:

determining a demanded cell number signal, which is a number of the cells which demand to be transferred from each first cell switch to each third cell switch;

generating a first assignment status signal indicative of the availability of a particular path between the second cell switches and the third cell switches and a second assignment status signal indicative of the availability of a particular path between the first cell switches and the second cell switches;

assigning a cell transfer path based on the above-mentioned assignment status signals and the demanded cell number signal; and transferring the cell through the assigned path.

25. A method for arbitrating cell transfer paths in a growable interconnect fabric cell switch module for receiving data in cell configuration and outputting cells of data, including a plurality of first cell switches for interconnecting the cells by receiving the cells into the switch module, a plurality of second cell switches for receiving the cells outputted from the first cell switches and a plurality of third cell switches for receiving the cells outputted from the second cell switches, the method comprising the steps of:

determining a demanded cell number signal, which is a number of the cells which demand to be transferred from each first cell switch to each third cell switch;

generating a permission status signal indicative of the availability of a particular path between the second cell switches and the third cell switches and an assignment status signal indicative of the availability of a path between the first cell switches and the second cell switches;

assigning a non-default path between the first cell switches and the second cell switches based on the permission status signal, the assignment status signal and the demanded cell number signal; and transferring the cell through the assigned path.

26. The method of claim 25, wherein, in the steps of assigning the non-default path, the paths which have different third cell switches as destinations and also have different paths between the first cell switches and the second cell switches are assigned simultaneously.

27. The method of claim 25, wherein, in the step of assigning the non-default path, the paths are assigned by determining one of the third cell switches as a destination of the cell which is to be sent to each second cell switch.

28. A growable interconnect fabric cell switch module for receiving data in a cell configuration and outputting data cells comprising:

a plurality of switching stages including a first switching stage, a second switching stage, and a third switching stage, the plurality of switching stages being characterized by a plurality of paths therethrough, each path beginning at the first switching stage, continuing through the second switching stage, and ending at the third switching stage, the first switching stage receiving cells entering into the switch module and monitoring the received cells to generate a demanded call number, and the third switching stage outputting cells from the switching module;

cell receiving means for inputting the cells into the first switching stage;

cell transmitting means for outputting the cells from the third switching stage; and a cell transfer arbitration means operatively connected with the plurality of switching stages for selecting one of the plurality of paths, associating a received cell with the selected path, and propagating the cell therethrough through utilization of said demanded cell number.

29. A growable interconnect fabric cell switch module for receiving data in a cell configuration and outputting data cells comprising:
- a first switching stage consisting of a plurality of first cell switches including a cell receiving means for receiving cells entering into the switch module, the first switching stage monitoring the received cells, sending a demanded cell number relating to the received cells to a cell transfer arbitration means, and receiving a permission signal, from the cell transfer arbitration means, to transfer cells to a second switching stage;
- a second switching stage consisting of a plurality of second cell switches for receiving cells from the first switching stage and outputting cells to a third switching stage;
- a third switching stage consisting of a plurality of third cell switches including a cell transmitting means for transmitting cells from the switch module;
- a plurality of paths through the switch module, wherein each path begins at a first cell switch, continues through a second cell switch, and ends at a third cell switch; and
- cell transfer arbitration means for using the demanded cell number sent thereto from the first switching stage to select one of the plurality of paths, associating a received cell with the selected path, and sending a permission signal to the first switching stage to transfer the cell through the switch module via the selected path, the first and third switches ensure the order.

30. The growable interconnect fabric cell switch module of claim 29, wherein the first switching stage's cell receiving means further comprises a means for converting received cells from a serial data format to a parallel format.

31. The growable interconnect fabric cell switch module of claim 30, wherein the last switching stage's cell transmitting means further comprises a means for converting cells received therein from a parallel data format to a serial format before the cells are output from the switch module.

32. A growable interconnect fabric cell switch module for receiving data in a cell configuration and outputting data cells comprising:
- a first switching stage consisting of a plurality of first cell switches including a cell receiving means for receiving cells entering into the switch module, the first switching stage monitoring the received cells, sending a data relating to the received cells to a cell transfer arbitration means, and receiving a permission signal, from the cell transfer arbitration means, to transfer cells to a second switching stage;
- a second switching stage consisting of a plurality of second cell switches for receiving cells from the first switching stage and outputting cells to a third switching stage;
- a third switching stage consisting of a plurality of third cell switches including a cell transmitting means for transmitting cells from the switch module;
- a fourth switching stage consisting of a plurality of fourth cell switches including a bypass path cell receiving means for receiving cells entering into the switch module, the fourth switching stage receiving a permission signal, from the cell transfer arbitration means, to transfer cells to a fifth switching stage;
- a fifth switching stage consisting of a plurality of fifth cell switches for receiving cells from the fourth switching stage and outputting cells to the third switching stage;
- a plurality of paths through the switch module, each path characterized as one of beginning at a first cell switch, continuing through a second cell switch, and ending at a third cell switch, and beginning at a fourth cell switch, continuing through a fifth cell switch, and ending at a third cell switch; and
- cell transfer arbitration means for (1) using the data being sent to the cell arbitration means from the first switching stage to select one of the plurality of paths, (2) associating a received cell with the selected path, and (3) sending a permission signal to one of the first switching stage and the fourth switching stage to transfer the cell through the switch module via the selected path, wherein the first and third switches ensure the order.

33. A growable interconnect fabric cell switch module for receiving data in a cell configuration and outputting data cells comprising:
- a first switching stage consisting of a plurality of first cell switches including a cell receiving means for receiving cells entering into the switch module, the first switching stage further comprised of:
  - cell transfer demanding means for storing and generating a demanded cell number for each first cell switch, wherein the demanded cell numbers indicate the number of cells to be transferred from each first cell switch to each third cell switch; and
  - cell transfer means for outputting cells from the first switching stage to a second switching stage in response to a cell transfer permitting signal; and
- a second switching stage consisting of a plurality of second cell switches for receiving cells from the first switching stage and outputting cells to a third switching stage;
- a third switching stage consisting of a plurality of third cell switches including a cell transmitting means for transmitting cells from the switch module;
- a plurality of paths through the switch module, each path beginning at a first cell switch, continuing through a second cell switch, and ending at a third cell switch;
- cell transfer arbitration means for propagating cells through the switch module the first and third switches ensure the order, the cell transfer arbitration means being comprised of:
  - demanded cell number registering means for receiving the demanded cell numbers and using these numbers to generate unused notifying path signals, each such signal indicating whether a particular path between a second cell switch and a third cell switch is available, and to generate reassignment demanding signals, each such signal indicating whether one of the plurality of paths should be reassigned, the demanded cell number registering means receiving a used path registering signal when a path is to be reassigned and, in response thereto, decrements the demanded cell number corresponding to the cell which is to utilize the reassigned path;

unused path reassigning means for receiving the unused notifying path signals, the reassignment demanding signals, and double registering preventing signals, the above-mentioned signals are used to generate a used path registering signal which reassigns one of the plurality of paths; and used path registering means for receiving the used path registering signals and using these signals to generate double register preventing signals, each such signal indicating whether reassignment of a desired path is possible, and to generate a cell transfer permitting signal which is sent to the cell transferring means, thereby selecting one of the plurality of paths, associating a received cell with the selected path, and propagating the cell therethrough.

34. A growable interconnect fabric cell switch module for receiving data in a cell configuration and outputting data cells comprising:

a first switching stage consisting of a plurality of first cell switches including a cell receiving means for receiving cells entering into the switch module, the first switching stage further comprised of:

cell transfer demanding means for storing and generating a demanded cell number for each first cell switch, the demanded cell numbers indicating the number of cells respectively received by the first cell switches; and cell transfer means for outputting cells from the first switching stage to a second switching stage in response to a cell transfer permitting signal; and a second switching stage consisting of a plurality of second cell switches for receiving cells from the first switching stage and outputting cells to a third switching stage;

a third switching stage consisting of a plurality of third cell switches including a cell transmitting means for transmitting cells from the switch module;

a fourth switching stage consisting of a plurality of fourth cell switches including a bypass path cell receiving means for receiving cells entering into the switch module, the fourth switching stage including a cell transfer means for outputting cells from the fourth switching stage to a fifth switching stage in response to a cell transfer permitting signal, wherein said cell transfer demanding means' demanded cell numbers additionally indicate the number of cells respectively received by the fourth cell switches;

a fifth switching stage consisting of a plurality of fifth cell switches for receiving cells from the fourth switching stage and outputting cells to the third switching stage;

a plurality of paths through the switch module, each path characterized as one of beginning at a first cell switch, continuing through a second cell switch, and ending at a third cell switch, and beginning at a fourth cell switch, continuing through a fifth cell switch, and ending at a third cell switch;

cell transfer arbitration means for propagating cells through the switch module the first and third switches ensure the order, the cell transfer arbitration means comprised of:

demanded cell number registering means for receiving the demanded cell numbers and using these numbers to generate unused notifying path signals, each such signal indicating whether one of a particular path between a second cell switch and a third cell switch and between a fifth cell switch and a third cell switch is available, and to generate reassignment demanding signals, each such signal indicating whether one of the plurality of paths should be reassigned, the demanded cell number registering means receiving a used path registering signal when a path is to be reassigned and, in response thereto, decrements the demanded cell number corresponding to the cell which is to utilize the reassigned path;

unused path reassigning means for receiving the unused notifying path signals, the reassignment demanding signals, and double registering preventing signals, the above-mentioned signals being used to generate a used path registering signal which reassigns one of the plurality of paths; and used path registering means for receiving the used path registering signals and using these signals to generate double register preventing signals, each such signal indicating whether reassignment of a desired path is possible, and to generate a cell transfer permitting signal which is sent to the cell transferring means, thereby selecting one of the plurality of paths, associating a received cell with the selected path, and propagating the cell therethrough.

* * * * *